(12) United States Patent
Gschwind et al.

(10) Patent No.: US 9,513,924 B2
(45) Date of Patent: Dec. 6, 2016

(54) PREDICTOR DATA STRUCTURE FOR USE IN PIPELINED PROCESSING

(71) Applicant: GLOBALFOUNDRIES Inc., Grand Cayman (KY)

(72) Inventors: Michael K. Gschwind, Chappaqua, NY (US); Valentina Salapura, Chappaqua, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 788 days.

(21) Appl. No.: 13/931,671

(22) Filed: Jun. 28, 2013

(65) Prior Publication Data
US 2015/0006862 A1    Jan. 1, 2015

(51) Int. Cl.
G06F 9/38    (2006.01)
G06F 9/30    (2006.01)

(52) U.S. Cl.
CPC ......... *G06F 9/3861* (2013.01); *G06F 9/30054* (2013.01); *G06F 9/30076* (2013.01); *G06F 9/30145* (2013.01); *G06F 9/30189* (2013.01); *G06F 9/382* (2013.01); *G06F 9/384* (2013.01); *G06F 9/3806* (2013.01)

(58) Field of Classification Search
None
See application file for complete search history.

(56) References Cited

U.S. PATENT DOCUMENTS 5,313,634 A * 5/1994 Eickemeyer ........ G06F 9/30054
712/240
5,454,117 A * 9/1995 Puziol ................... G06F 9/3806
712/23
5,551,013 A    8/1996 Beausoleil et al.
5,574,873 A    11/1996 Davidian
5,721,855 A * 2/1998 Hinton ................ G06F 9/30152
711/E12.049

(Continued)

FOREIGN PATENT DOCUMENTS

EP         0848323 A2 *  6/1998  ........... G06F 9/3804

OTHER PUBLICATIONS

'Cortex-A9 Technical Reference Manual' Revision: r2p2, copyright 2008-2010, ARM.*

(Continued)

*Primary Examiner* — Steven Snyder
(74) *Attorney, Agent, or Firm* — Heslin Rothenberg Farley & Mesiti P.C.; Nathan Brian Davis

(57) ABSTRACT

A predictor data structure is used for pipelined processing by a pipelined processor. The predictor data structure includes a predicted address to be used in return from execution of a selected instruction, and a predicted operating state associated with the predicted address. Based on determining a selected return instruction is to be executed, the predicted address to which processing is to be returned is obtained from the predictor data structure. Further, based on determining the selected return instruction is to be executed, a transitional operating state to be entered based on the predicted operating state stored in the predictor data structure is predicted, wherein at least one of the predicted address and the predicted transitional operating state are to be used to validate execution of the selected return instruction.

15 Claims, 19 Drawing Sheets

(56) References Cited

U.S. PATENT DOCUMENTS

| | | | |
|---|---|---|---|
| 5,784,586 A * | 7/1998 | Simone | G06F 9/3861 712/216 |
| 5,790,825 A | 8/1998 | Traut | |
| 5,838,940 A * | 11/1998 | Savkar | G06F 9/3802 712/200 |
| 5,896,528 A * | 4/1999 | Katsuno | G06F 9/30058 712/239 |
| 5,935,241 A * | 8/1999 | Shiell | G06F 9/3804 712/238 |
| 6,009,261 A | 12/1999 | Scalzi et al. | |
| 6,108,775 A * | 8/2000 | Shiell | G06F 9/3017 712/233 |
| 6,253,316 B1 * | 6/2001 | Tran | G06F 9/3806 712/237 |
| 6,256,729 B1 * | 7/2001 | Cherabuddi | G06F 9/3861 712/238 |
| 6,289,444 B1 * | 9/2001 | Nair | G06F 9/3806 712/216 |
| 6,304,960 B1 | 10/2001 | Yeh et al. | |
| 6,308,255 B1 | 10/2001 | Gorishek, IV et al. | |
| 6,332,191 B1 * | 12/2001 | Witt | G06F 9/30149 712/237 |
| 6,393,556 B1 | 5/2002 | Arora | |
| 6,463,582 B1 | 10/2002 | Lethin et al. | |
| 6,934,832 B1 * | 8/2005 | Van Dyke | G06F 9/30174 712/244 |
| 6,954,923 B1 * | 10/2005 | Yates, Jr. | G06F 9/30174 712/208 |
| 6,978,462 B1 * | 12/2005 | Adler | G06F 9/30149 719/318 |
| 7,047,394 B1 * | 5/2006 | Van Dyke | G06F 9/30167 703/26 |
| 7,203,833 B1 * | 4/2007 | Abadi | G06F 21/52 705/59 |
| 8,307,353 B2 | 11/2012 | Wright et al. | |
| 8,566,569 B2 * | 10/2013 | Bonanno | G06F 9/3806 712/240 |
| 8,677,107 B2 * | 3/2014 | Grisenthwaite | G06F 9/30101 712/244 |
| 9,098,295 B2 * | 8/2015 | Gonion | G06F 9/30036 |
| 9,104,425 B2 * | 8/2015 | Grisenthwaite | G06F 9/30101 |
| 9,122,485 B2 * | 9/2015 | Gonion | G06F 9/30036 |
| 9,213,551 B2 * | 12/2015 | Shah | G06F 9/3851 |
| 2005/0080753 A1 | 4/2005 | Vega et al. | |
| 2008/0216073 A1 * | 9/2008 | Yates | G06F 9/30174 718/100 |
| 2009/0204785 A1 * | 8/2009 | Yates, Jr. | G06F 9/30174 711/205 |
| 2012/0036341 A1 | 2/2012 | Morfey et al. | |
| 2012/0191949 A1 * | 7/2012 | Gonion | G06F 9/30036 712/208 |
| 2012/0191957 A1 * | 7/2012 | Gonion | G06F 9/30036 712/222 |
| 2012/0233442 A1 | 9/2012 | Shah et al. | |
| 2012/0297167 A1 | 11/2012 | Shah et al. | |
| 2012/0311199 A1 | 12/2012 | Bender et al. | |
| 2012/0311307 A1 * | 12/2012 | Chynoweth | G06F 9/30054 712/234 |
| 2013/0086361 A1 | 4/2013 | Gschwind et al. | |
| 2014/0156972 A1 * | 6/2014 | Shanbhogue | G06F 9/30145 712/205 |
| 2014/0283040 A1 * | 9/2014 | Wilkerson | G06F 21/52 726/22 |
| 2015/0006854 A1 * | 1/2015 | Gschwind | G06F 9/30145 712/207 |
| 2015/0006855 A1 * | 1/2015 | Gschwind | G06F 9/30145 712/207 |
| 2015/0089193 A1 * | 3/2015 | Gschwind | G06F 9/30145 712/205 |
| 2015/0089194 A1 * | 3/2015 | Gschwind | G06F 9/30145 712/205 |
| 2016/0055003 A1 * | 2/2016 | Clancy | G06F 9/3861 711/136 |

OTHER PUBLICATIONS

'A Reliable Return Address Stack: Microarchitectural Features to Defeat Stack Smashing' by Dong Ye and David Kaeli, ACM SIGARCH Computer Architecture News, vol. 33, No. 1, Mar. 2005.*

'Traps, Exceptions, System Calls, & Privileged Mode' by Hakim Weatherspoon, CS 3410, Spring 2012, Computer Science, Cornell University.*

'Repairing Return Address Stack for Buffer Overflow Protection' by Yong-Joon Park and Gyungho Lee, copyright 2004, ACM.*

"Power ISA™ Version 2.07," International Business Machines Corporation, May 2013, pp. 1-1526.

"z/Architecture Principles of Operation," IBM® Publication No. SA22-7832-09, Tenth Edition, Sep. 2012, pp. 1-1568.

Lewis, J., "An Automatic Prefetching and Caching System," In Performance Computing and Communications Conference (IPCCC), 2010 IEEE 29$^{th}$ International, Dec. 2010, pp. 180-187.

Tendler et al., "POWER4 system microarchitecture," IBM J. Res. & Dev., vol. 46, No. 1, Jan. 2002, pp. 5-25.

Salapura, et al., "Using Register Last-Use Information to Perform Decode-Time Computer Instruction Optimization," U.S. Appl. No. 13/251,486, filed Oct. 3, 2011, pp. 1-96.

Salapura, et al., "Generating Compiled Code that Indicates Register Liveness," U.S. Appl. No. 13/251,803, filed Oct. 3, 2011, pp. 1-54.

Salapura, et al., "Generating Compiled Code that Indicates Register Liveness," U.S. Appl. No. 13/664,595, filed Oct. 31, 2012, pp. 1-52.

Salapura, et al., "Prefix Computer Instruction for Compatibly Extending Instruction Functionality," U.S. Appl. No. 13/251,426, filed Oct. 3, 2011, pp. 1-85.

Salapura, et al., "Tracking Operand Liveness Information in a Computer System and Performing Function Based on the Liveliness Information," U.S. Appl. No. 13/251,441, filed Oct. 3, 2011, pp. 1-75.

Salapura, et al., "Caching Optimized Internal Instructions in Loop Buffer," U.S. Appl. No. 13/432,512, filed Mar. 28, 2012, pp. 1-41.

Salapura et al., "Performing Predecode-Time Optimized Instructions in Conjunction with Predecode Time Optimized Instruction Sequence Caching," U.S. Appl. No. 13/432,357, filed Mar. 28, 2012, pp. 1-32.

Salapura et al., "Decode Time Instruction Optimization for Load Reserve and Store Conditional Sequences," U.S. Appl. No. 13/432,404, filed Mar. 28, 2012, pp. 1-52.

Salapura et al., "Decode Time Instruction Optimization for Load Reserve and Store Conditional Sequences," U.S. Appl. No. 13/783,985, filed Mar. 4, 2013, pp. 1-49.

Salapura et al., "Instruction Merging Optimization," U.S. Appl. No. 13/432,458, filed Mar. 28, 2012, pp. 1-36.

Salapura et al., "Instruction Merging Optimization," U.S. Appl. No. 13/790,580, filed Mar. 8, 2013, pp. 1-40.

Salapura et al., "Instruction Merging Optimization," U.S. Appl. No. 13/432,537, filed Mar. 28, 2012, pp. 1-35.

Salapura et al., "Instruction Merging Optimization," U.S. Appl. No. 13/790,632, filed Mar. 8, 2013, pp. 1-31.

Schwarz, E., "Modify and Execute Next Sequential Instruction Facility and Instructions Therefore," U.S. Appl. No. 13/710,494, filed Dec. 11, 2012, pp. 1-100.

Gschwind, et al., "Predictive Fetching and Decoding for Selected Return Instructions," U.S. Appl. No. 13/931,635, filed Jun. 28, 2013, pp. 1-82.

Gschwind, et al., "Predictive Fetching and Decoding for Selected Instructions," U.S. Appl. No. 13/931,656, filed Jun. 28, 2013, pp. 1-81.

* cited by examiner

PREDICTOR DATA STRUCTURE FOR USE IN PIPELINED PROCESSING

BACKGROUND

One or more aspects relate, in general, to processing within a processing environment, and in particular, to execution of instructions that alter a privilege level or other operating state of the processing environment.

Processors execute instructions that direct the processors to perform specific operations. The instructions may be part of user applications that perform user-defined tasks, or part of operating system applications that perform system level services, as examples. The instructions included within user applications have a certain privilege level, while the instructions of the operating system applications have another privilege level. The privilege level of the operating system instructions is typically higher than the privilege level of the user applications. This higher privilege is to provide security within the processors preventing user applications from causing damage within the processors.

Instructions, regardless of the type or privilege level, are executed by the processors. The processors may use different types of processing techniques to process the instructions. One processing technique is referred to as pipelined processing, in which processing is performed in stages. Example stages include a fetch stage in which the processor fetches an instruction from memory; a decode stage in which the fetched instruction is decoded; an execute stage in which the decoded instruction is executed; and a complete stage in which execution of the instruction is completed, including updating architectural state relating to the processing. Other and/or different stages are also possible.

The use of pipelined processing for certain instructions may create latency impacting performance. This is particularly true in those situations in which execution of the instruction requires that all instructions in the pipeline, that are fetched after the instruction, be flushed and the instruction causes one or more other instructions to be fetched from the beginning of the pipeline.

BRIEF SUMMARY

Shortcomings of the prior art are overcome and additional advantages are provided through the provision of a computer program product for facilitating processing within a processing environment. The computer program product includes a computer readable storage medium readable by a processing circuit and storing instructions for execution by the processing circuit for performing a method. The method includes, for instance, using a predictor data structure for pipelined processing by a pipelined processor, the predictor data structure including a predicted address to be used in return from execution of a selected instruction, and a predicted operating state associated with the predicted address; based on determining a selected return instruction is to be executed, obtaining from the predictor data structure the predicted address to which processing is to be returned; and based on determining the selected return instruction is to be executed, predicting a transitional operating state to be entered based on the predicted operating state stored in the predictor data structure, wherein at least one of the predicted address and the predicted transitional operating state are to be used to validate execution of the selected return instruction.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
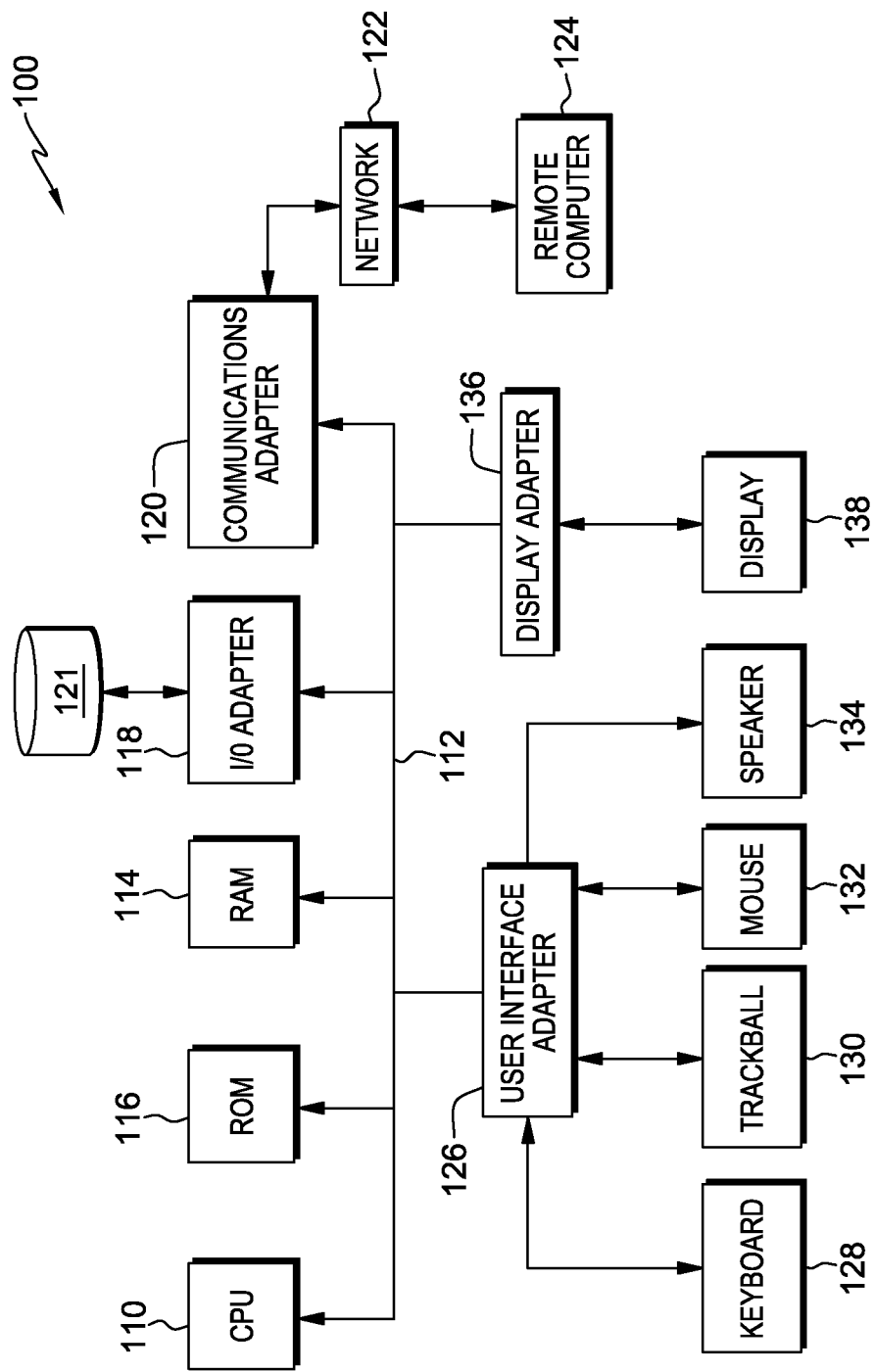
FIG. 1 depicts one embodiment of a processing environment to incorporate and use one or more aspects of the predictive fetching and decoding capability.

In accordance with one aspect, a capability is provided for predictive fetching and decoding for selected instructions, such as instructions that alter the privilege level and/or other operating state within the processor (e.g., operating system instructions, hypervisor instructions or other such instructions), and/or other selected instructions, as examples. The capability includes, for instance, determining that a selected instruction, such as a system call instruction, an asynchronous interrupt, a return from system call instruction or return from asynchronous interrupt, is to be executed; determining a predicted address for the selected instruction, which is the address to which processing transfers in order to provide the requested services; and commencing fetching instructions beginning at the predicted address prior to execution of the selected instruction. The capability further includes, in one embodiment, predicting and/or maintaining speculative state relating to a selected instruction, including, for instance, an indication of the privilege level of the selected instruction or instructions executed on behalf of the selected instruction.

This predictive capability may be used in many different processing environments executing different processors. For instance, it may be used with processors based on the z/Architecture offered by International Business Machines Corporation. One or more of the processors may be part of a server, such as the System z server, which implements the z/Architecture and is offered by International Business Machines Corporation. One embodiment of the z/Architecture is described in an IBM publication entitled, "z/Architecture Principles of Operation," IBM Publication No. SA22-7832-09, Tenth Edition, September 2012, which is hereby incorporated herein by reference in its entirety. In one example, one or more of the processors executes an operating system, such as the z/OS operating system, also offered by International Business Machines Corporation. IBM, Z/ARCHITECTURE and Z/OS are registered trademarks of International Business Machines Corporation, Armonk, N.Y., USA. Other names used herein may be registered trademarks, trademarks, or product names of International Business Machines Corporation or other companies.

In a further embodiment, the processors are based on the Power Architecture offered by International Business Machines Corporation, and may be, for instance, Power 700 series processors. One embodiment of the Power Architecture is described in "Power ISA Version 2.07," International Business Machines Corporation, May 3, 2013, which is hereby incorporated herein by reference in its entirety. POWER ARCHITECTURE is a registered trademark of International Business Machines Corporation.

One particular example of a processing environment to incorporate and use one or more aspects of the predictive capability is described with reference to FIG. 1. In this particular example, the processing environment is based on the Power Architecture offered by International Business Machines Corporation, but this is only one example. One or more aspects are applicable to other architectures offered by International Business Machines Corporation or other companies.

Referring to FIG. 1, a processing environment 100 includes, for instance, a central processing unit (CPU) 110, which is coupled to various other components by an interconnect 112, including, for example, a read-only memory (ROM) 116 that includes a basic input/output system (BIOS) that controls certain basic functions of the processing environment, a random access memory (RAM) 114, an I/O adapter 118, and a communications adapter 120. I/O adapter 118 may be a small computer system interface (SCSI) adapter that communicates with a storage device 121. Communications adapter 120 interfaces interconnect 112 with a network 122, which enables processing environment 100 to communicate with other systems, such as remote computer 124.

Interconnect 112 also has input/output devices connected thereto via a user interface adapter 126 and a display adapter 136. Keyboard 128, trackball 130, mouse 132 and speaker 134 are all interconnected to bus 112 via user interface adapter 126. Display 138 is connected to system bus 112 by display adapter 136. In this manner, processing environment 100 receives input, for example, through keyboard 128, trackball 130, and/or mouse 132, and provides output, for example, via network 122, on storage device 121, speaker 134 and/or display 138, as examples. The hardware elements depicted in processing environment 100 are not intended to be exhaustive, but rather represent example components of a processing environment in one embodiment.

Operation of processing environment 100 can be controlled by program code, such as firmware and/or software, which typically includes, for example, an operating system such as AIX® (AIX is a trademark of International Business Machines Corporation) and one or more application or middleware programs. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. Such program code comprises instructions discussed below with reference to FIG. 2.

Figure 2:
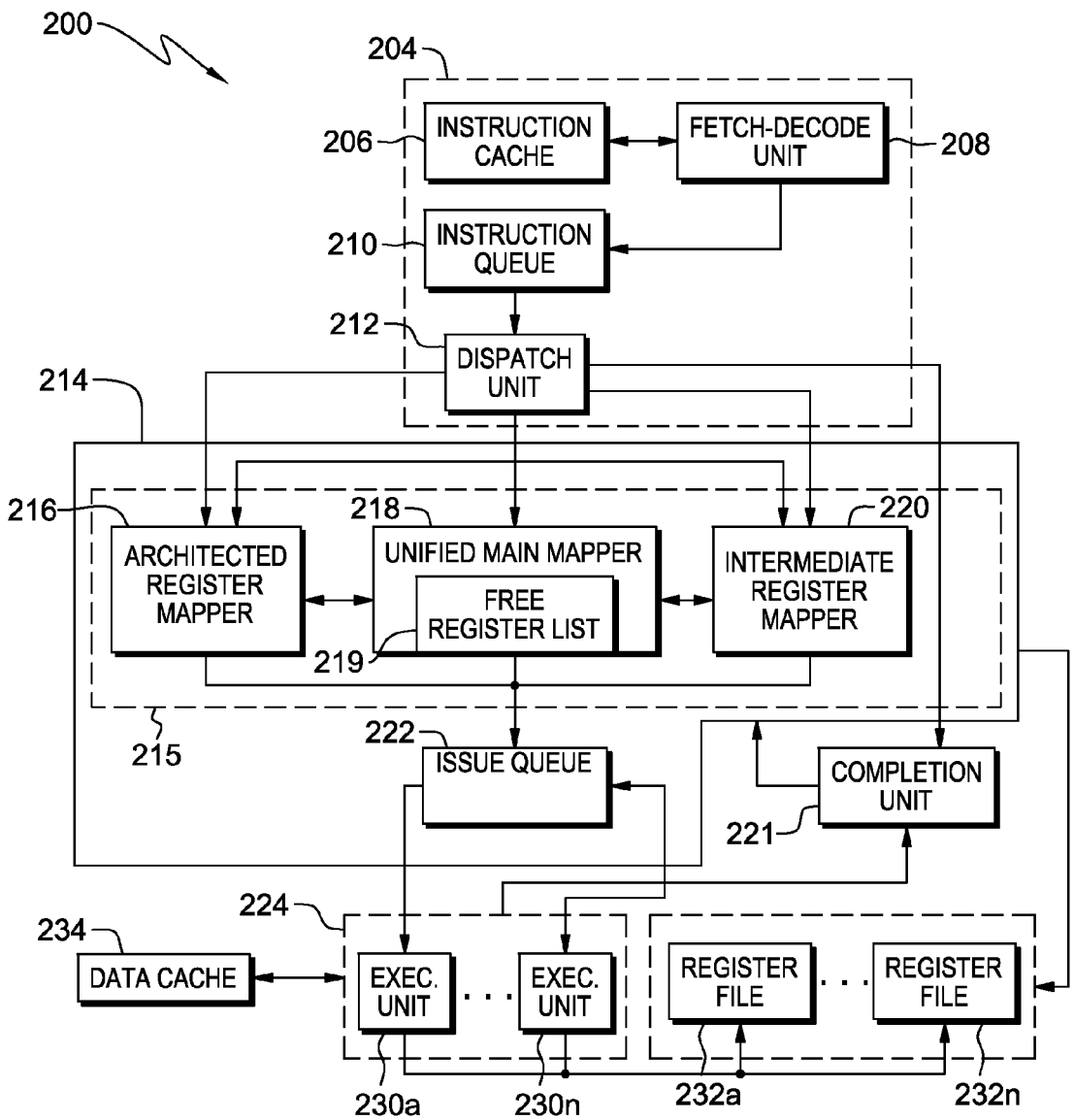
FIG. 2 depicts further details of a processor of the processing environment of FIG. 1.

Referring to FIG. 2, further details of a processor 200 (e.g., central processing unit 110) of the processing environment are discussed. In one example, the processor is a super-scalar processor, which retrieves instructions from memory (e.g., RAM 114 of FIG. 1) and loads them into instruction sequencing logic (ISL) 204 of the processor. The instruction sequencing logic includes, for instance, a Level 1 Instruction cache (L1 I-cache) 206, a fetch-decode unit 208, an instruction queue 210 and a dispatch unit 212. In one example, the instructions are loaded in L1 I-cache 206 of ISL 204, and they are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 221. Completion unit 221 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. Subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, including, for instance, floating-point (FP), fixed-point (FX), and load/store (LS). General execution engine 224 exchanges data with data memory (e.g., RAM 114, ROM 116 of FIG. 1) via a data cache 234. Moreover, issue queue 222 may contain instructions of floating point type or fixed-point type, and/or load/store instructions. However, it should be appreciated that any number and types of instructions can be used. During execution, EUs 230a-230n obtain the source operand values from physical locations in register files 232a-232n and store result data, if any, in register files 232a-232n and/or data cache 234.

Register management unit 214 includes, for instance: (i) mapper cluster 215, which includes architected register mapper 216, unified main mapper 218, and intermediate register mapper 220; and (ii) issue queue 222. Mapper cluster 215 tracks the physical registers assigned to the logical registers of various instructions. In one embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers than described in this embodiment. Further, architected register mapper 216 includes a pointer list that identifies a physical register which describes the checkpointed state. Physical register files 232a-232n typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order (OoO). Out-of-order execution typically occurs when there are older instructions which would take longer (i.e., make use of more clock cycles) to execute than newer instructions in the pipeline. However, should an out-of-order instruction's executed result require that it be flushed for a particular reason (e.g., a branch miss-prediction), the processor can revert to the checkpointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an out-of-order instruction, unified main mapper 218 also keeps track of dependency data (i.e., instructions that are dependent upon the finishing of an older instruction in the pipeline), which is used for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In some mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 can conceivably dispatch more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

However, in one embodiment, intermediate register mapper 220 serves as a non-timing-critical register for which a "finished," but "incomplete" instruction from unified main mapper 218 could retire to (i.e., removed from unified main mapper 218) in advance of the instruction's eventual completion. Once the instruction "completes," completion unit 221 notifies intermediate register mapper 220 of the completion. The mapper entry in intermediate register mapper 220 can then update the architected coherent state of architected register mapper 216 by replacing the corresponding entry that was presently stored in architected register mapper 216.

Further details regarding one embodiment of the mappers and processing associated therewith are described in U.S. Publication Number 2013/0086361, entitled "Scalable Decode-Time Instruction Sequence Optimization of Dependent Instructions, Gschwind et al., published Apr. 4, 2013, which is hereby incorporated herein by reference in its entirety.

Figure 3:
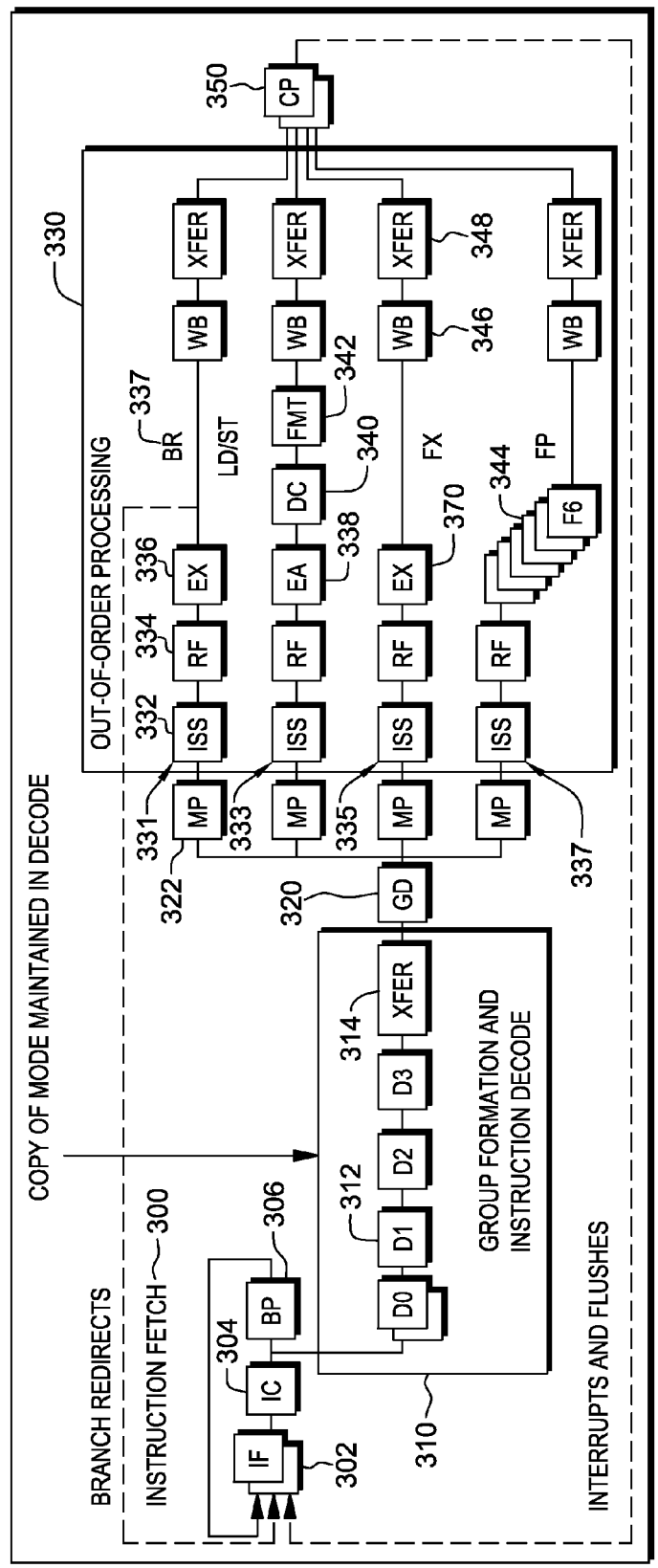
FIG. 3 depicts one embodiment of an instruction pipeline of a processor of a processing environment.

As referenced above, processor 200 employs pipelined processing to execute the instructions fetched from memory. Further details regarding one embodiment of this processing are described with reference to FIG. 3, which depicts one example of a processor pipeline. In one example, instructions are fetched into an instruction fetch unit 300, which includes, for instance, an instruction fetch (IF) 302, an instruction cache (IC) 304 and a branch predictor 306. Instruction fetch unit 300 is coupled to a group formation and decode unit 310, which includes one or more decode stages (Dn) 312, as well as a transfer stage (Xfer) 314 to transfer the decoded instructions to group dispatch (GD) 320. Group dispatch 320 is coupled to mapping units (MP) 322 (such as architected register mapper 216, unified main mapper 218, and/or intermediate register mapper 220 of FIG. 2), which are coupled to a processing unit 330.

Processing unit 330 provides processing for different types of instructions. For example, at 331, processing for an instruction that includes a branch redirect (BR) 337 is depicted, and includes, for instance, instruction issue (ISS) 332, register file read (RF) 334, execute (EX) 336, branch redirect 337 to instruction fetch 302, write back (WB) 346, and transfer (Xfer) 348; at 333, processing for a load/store instruction is depicted that includes, for instance, instruction issue 332, register file read 334, compute address (EA) 338, data cache (DC) 340, format (FMT) 342, write back 346, and transfer 348; at 335, processing for a fixed-point instruction is depicted, and includes, for instance, instruction issue 332, register file read 334, execute 336, write back 346, and transfer 348; and at 337, processing for a floating point instruction is depicted that includes, for instance, instruction issue 332, register file read 334, six cycle floating point unit (F6) 344, write back 346, and transfer 348. Processing for each type of instruction transfers to group commit (CP) 350. The output of group commit 350 is coupled to instruction fetch 302, in the case of interrupts and flushes, as examples.

In one embodiment, a selected instruction, such as a system call or return from system call instruction, is executed (see, e.g., reference numeral at 370) when the selected instruction is the next instruction to complete (NTC) meaning that all of the other instructions before it in the pipeline have completed. When it does execute, then conventionally, all instructions behind the selected instruction are flushed. Instructions are then re-fetched with a new privilege level (e.g., operating system level) from an execution point depending on a system call entry address (e.g., a target address of the system call) or a specified return from system call address, corresponding to the specific instruction being executed.

Similar processing is performed when other types of instructions are to be executed that change the privilege level and/or other operating state in the pipeline.

Figure 4:
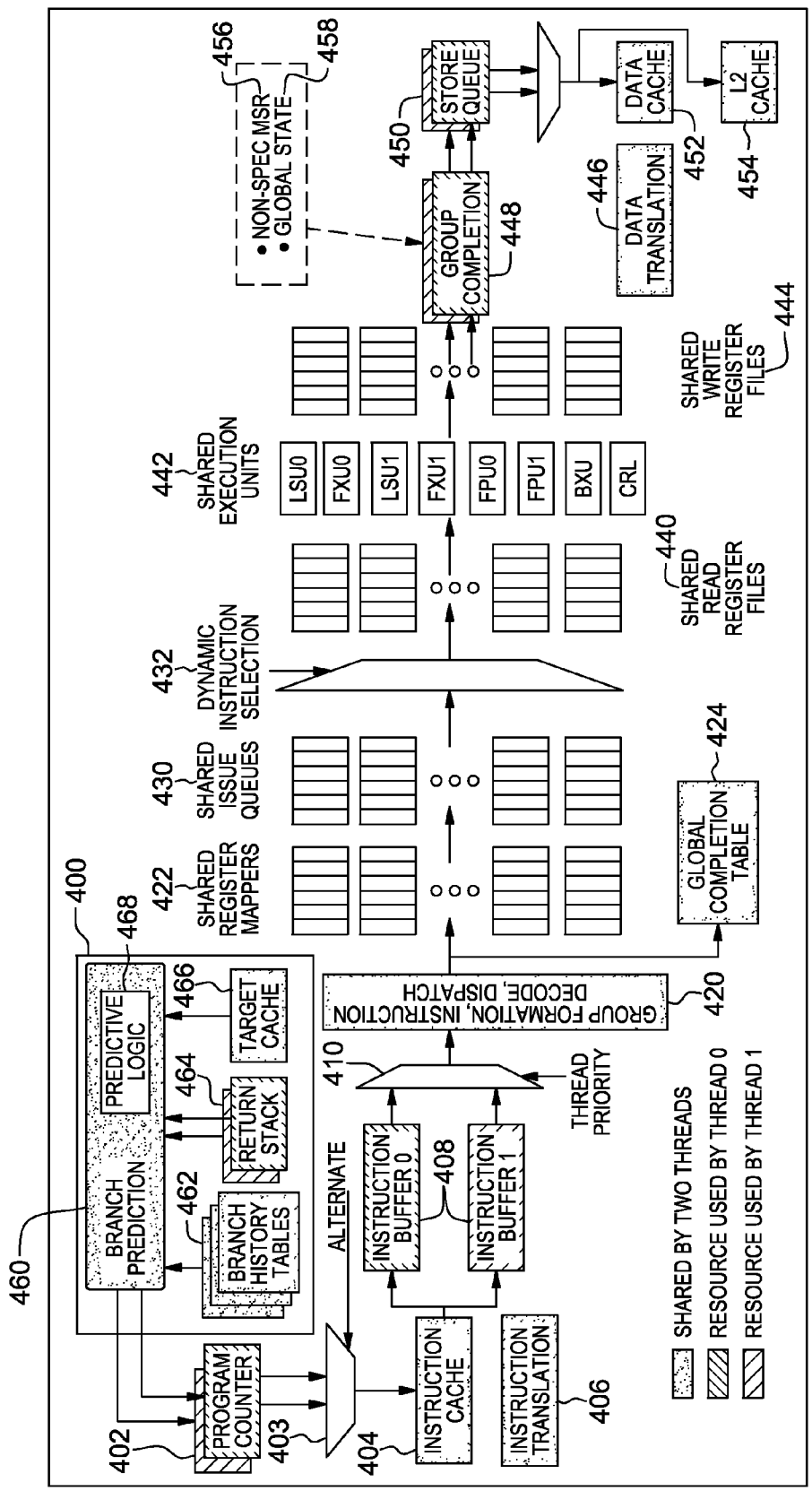
FIG. 4 depicts further details of instruction pipeline processing in accordance with one aspect.

Further details regarding instruction data flow are described with reference to FIG. 4. As shown, a particular data flow, depending on the instruction, may use one or more of the following: a branch prediction unit 400 coupled to a program counter 402, which is further coupled to an instruction cache 404 via a multiplexor 403. Instruction cache 404 is coupled to instruction translation 406, as well as one or more instruction buffers 408. Instruction buffers 408 are coupled to a multiplexor 410 that may use thread priority to forward the fetched instructions to group formation, instruction decode, dispatch unit 420. Unit 420 is then further coupled to shared register mappers 422 (e.g., mappers 216, 218, 220 of FIG. 2) and a global completion table 424, which is a data structure that tracks the instructions for completion.

From the mappers, the data flows through shared issue queues 430 (e.g., issue queue 222 of FIG. 2); a multiplexor 432 for dynamic instruction selection; shared read logic for the shared register files 440 (e.g., register files 232a-232n of FIG. 2); shared execution units 442, such as load/store units (LSU), fixed point execution units (FXU), floating point execution units (FPU), branch execution units (BXU), and condition register logical execution units (CRL) (e.g., execution units 230a-230n of FIG. 2); shared write logic for the shared register files 444 (e.g., register files 232a-232n of FIG. 2); data translation 446, if needed; group completion 448 (e.g., completion unit 221 of FIG. 2 or CP 350 of FIG. 3); and store queues 450. Store queues 450 are coupled via a multiplexor 452 to one or more of a data cache 452 and a L2 cache 454.

Group completion 448 is further operatively coupled to one or more data structures and/or memory locations that include state for the processing environment, such as global state 458 indicating, for instance, the current privilege level in the pipeline; a non-speculative machine state register (MSR) 456 that provides shared machine state for each instruction executing in the pipeline; and optionally, other global state related to the tracking of instructions in the processor. The machine state register includes, for instance, a plurality of indicators (e.g., bits), and each indicator represents the state of a selected attribute. For instance, one indicator is used to specify the privilege level (e.g., user level, operating system level, hypervisor level) of the instruction; one indicator may be used to indicate whether instruction relocation is enabled; and/or another indicator may be used to indicate whether data relocation is enabled (instruction and data relocation are used for address translation). Other and/or different attributes may be specified.

Referring once again to branch prediction unit 400, it includes, for instance, branch prediction logic 460 that may reference one or more of branch history tables 462, a return stack 464, and a target cache 466 to be used to make a prediction, such as whether a branch will occur. The return stack, in one embodiment, is implemented as a link predictor stack, which predicts for subroutines, as an example, the address that the processor thinks the application will return to when it executes a return from subroutines. In accordance with one aspect, it also includes predicted addresses for return from selected instructions, such as those that alter the privilege level in the processor and/or other operating state, as described herein. In another aspect, a separate predictor for predicting addresses for return from selected instructions is provided.

Figure 5:
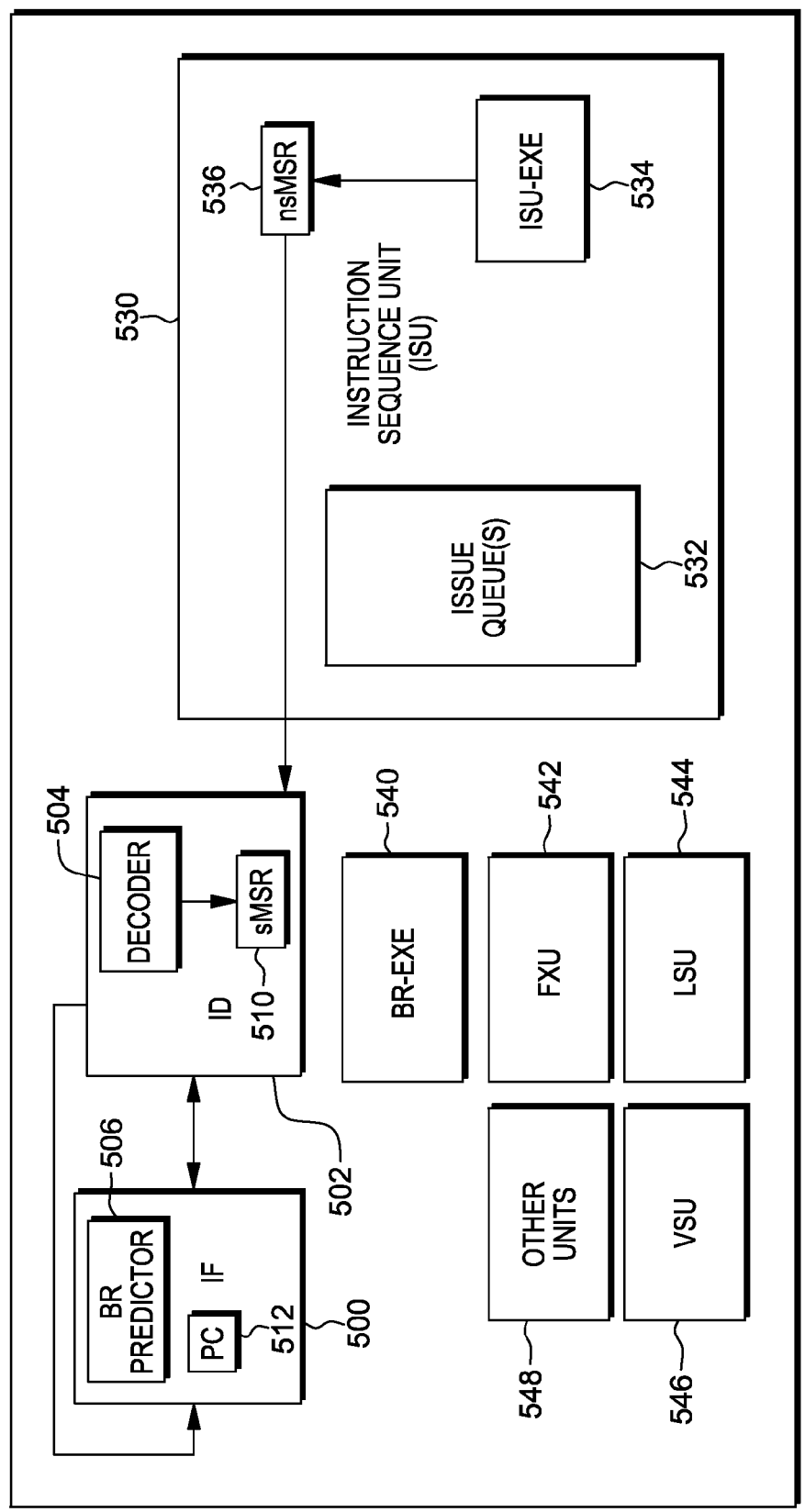
FIG. 5 depicts another example of instruction pipeline processing in accordance with one aspect.

In accordance with one aspect, branch prediction logic 460 is also used to predict whether a selected instruction, such as an instruction that alters the privilege level and/or other operating state, is to be executed, and if so, to predict a predicted address for that selected instruction. In one example, in which the instruction is a system call instruction, the predicted address is a system call entry address. The entry address is the address that the system call instruction transfers to when it is executed. By predicting the entry address, the instructions beginning at the entry address can be fetched and then decoded in unit 420 prior to reaching the execution of the selected instruction. This reduces the pipeline penalty of privilege level change in, for instance, the branch execution unit and condition register logical execution unit. To accomplish this, as described in further detail herein, branch prediction logic 460 includes predictive logic 468 to be used in predictive fetching and decoding associated with selected instructions. This predictive logic employs speculative state maintained, for instance, in a speculative MSR, which is coupled to the predictive logic. In one example, it is maintained in the decode logic, as depicted in FIG. 5.

In accordance with an aspect of the predictive capability, branch prediction logic is used to reduce costs associated with executing selected instructions, such as system call instructions, return from system call instructions, return from interrupts, as well as others. The predictive capability predicts whether a selected instruction (e.g., an instruction that alters the privilege level and/or another operating state in the processor) is to be executed in the instruction pipeline, and if so, it begins fetching and decoding the instructions that are associated with that instruction (e.g., the instructions at the predicted address). This reduces disruption of the pipeline when the selected instruction is executed and processing proceeds to the instructions at the predicted address. In at least one embodiment, the predictive logic is equipped to update a program counter (PC) (a.k.a., an instruction address register (JAR)) with the predicted fetch address for future instructions. Although in this example, the branch prediction logic includes the predictive fetching and decoding of selected instructions logic (referred to as predictive logic 468), in other embodiments, this logic may be included in other than branch prediction logic.

An overview of processing of a selected instruction, in accordance with one aspect, is described with reference to FIG. 5. As shown, an instruction fetch (IF) unit 500 is coupled to an instruction decode (ID) unit 502. Instructions are fetched from memory by the instruction fetch unit and are decoded by decoder 504 of decode unit 502. In one aspect, when an instruction is fetched, a prediction is made using, for instance, predictor 506, as to whether the particular fetched instruction is a selected instruction, such as an instruction that alters the privilege level and/or other operating state. For instance, a partial decode of the fetched instruction is performed to determine whether the instruction is a selected instruction. If it is a selected instruction, a predicted address for the selected instruction is predicted and stored in the program counter (PC) 512 of the instruction fetch unit. For instance, for a system call instruction, the predicted address is the system call entry address; and for a return from system call instruction, the predicted address is a return address. Further, state relating to the instruction at the predicted address is predicted and stored in speculative MSR 510.

The selected instruction works its way through the instruction pipeline to an instruction sequence unit (ISU) 530, which includes, for instance, one or more issue queues 532, and an instruction sequence execution unit 534, which updates non-speculative MSR 536. The non-speculative MSR represents the state of the instruction(s) executing in the pipeline. It is the actual state, rather than the predicted state, and in one embodiment, includes the same indicators as the speculative MSR. (In another embodiment, it contains a superset of the indicators in the speculative MSR.) The instruction sequence unit is coupled to one or more execution units, such as a branch redirect execution unit 540, a fixed point execution unit 542, a load/store execution unit 544, a vector-scalar execution unit 546, and one or more other execution units 548. The instruction is executed by one of these execution units. The execution of the instruction, in accordance with an aspect, does not cause a flush of the instructions fetched beginning at the predicted address that are now in the pipeline. Instead, instructions commencing at the predicted address of the selected instruction are fetched and/or decoded and are in the pipeline to be executed when the selected instruction is executed. In one embodiment, instructions starting at the predicted address are held at a pipeline stage, such as in the decode, dispatch, transfer or issue until the selected instruction has updated the non-speculative MSR state (e.g., 456 of FIG. 4 or 536 of FIG. 5).

Figure 6:
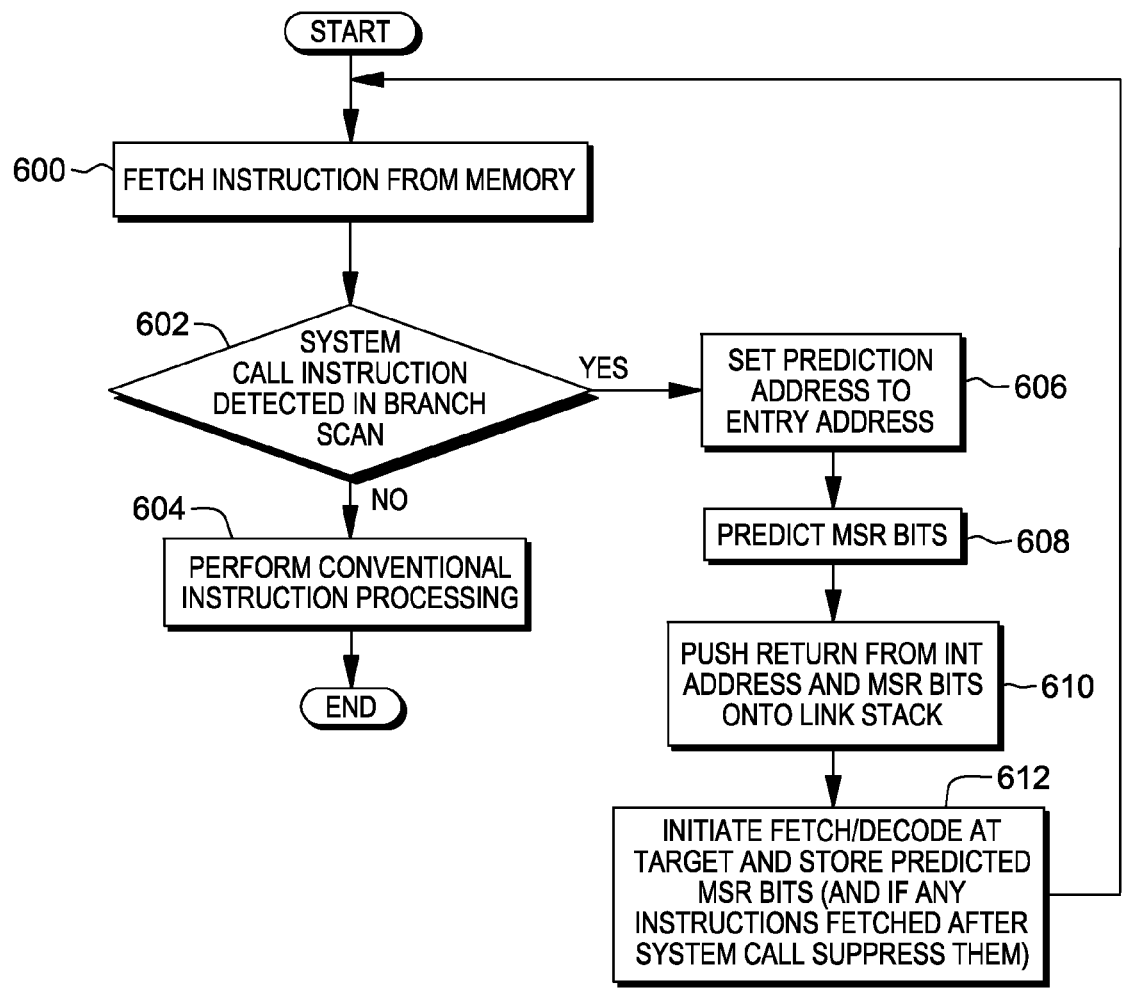
FIG. 6 depicts one embodiment of front-end execution of a system call instruction.

Further details regarding processing a selected instruction, such as a system call instruction, are described with reference to FIG. 6. In one embodiment, initially, an instruction is fetched from memory into the instruction fetch unit, STEP 600. Then, a scan, such as a branch scan (not a full decode), is performed to predict whether the instruction is a system call instruction, INQUIRY 602. The scan is performed by, for instance, the branch prediction logic located in the instruction fetch unit (or in another embodiment, may be in the decode unit). This prediction is made by, for instance, examining the opcode of the instruction and/or a parameter associated with the instruction. In another embodiment, predecode information is used to detect a system call instruction. In yet a further embodiment, a full decode of the instruction is performed. If it is not a system call instruction, then processing performs as conventional, STEP 604. In a further embodiment, other checks may be made to determine if the instruction is another type of selected instruction.

However, if it is predicted that a system call instruction is to be executed, then certain processing is performed to enable the fetching and decoding of one or more instructions associated with the system call instruction prior to execution of the system call instruction. Instructions already in the pipeline that have been fetched prior to the detected system call instruction are allowed to keep proceeding through the pipeline. This processing includes, for instance, setting a prediction address to an entry address of the selected instruction and storing it in the program counter, STEP 606. The entry address is the address that is to be accessed based on execution of the system call instruction. It is the target address of the system call instruction at which the fetching of one or more instructions on behalf of the system call instruction is performed. As examples, this system call entry address is derived from either a constant that is specified in the architecture specification, or obtained from a control register, an interrupt vector register, a special purpose register, or some designated memory location, as examples. In one example, caching is performed using a special purpose register that stores an interrupt value, when that value is dynamically modifiable in memory (e.g., the entry address) to avoid a memory access. In a further example, caching occurs in conjunction with a register indirect or a prediction table storing a plurality of predicted values, when the value is dynamically modifiable, to avoid memory access.

Additionally, if the system call instruction is predicted, a further prediction is made as to the values of one or more of the MSR indicators, such as the privilege level (e.g., operating system level), instruction relocation, data relocation, etc., for the instruction(s) to be fetched beginning at the entry address, STEP 608. In one example, the privilege level is obtained based on the system call instruction (e.g., based on the opcode or a parameter associated with the system call instruction) or based on a predictor table, when the level is stored in a register.

Further, optionally, an address that is be returned to after execution of the system call instruction is pushed onto a predictor stack, as well as a value to be predicted as a speculative MSR upon return from the system call. In one embodiment, the predicted value for the return from the system call reflects the current values of the non-speculative MSR, STEP 610. In another embodiment, the speculative MSR prior to being updated to the predicted MSR bits predicted in STEP 608 reflect the non-speculative MSR, and the speculative MSR bits reflective of non-speculative MSR bits are used to initialize the predictor stack. In yet another embodiment, e.g., when multiple levels of speculation are present in a processor concurrently, speculative MSR bits reflective of the speculative state prior to newly predicted MSR bits of STEP 608 are stored in a predictor stack.

Additionally, a fetch at the predicted address is initiated and the predicted MSR bits are stored in the speculative MSR coupled to the instruction fetch/decode unit(s), STEP 612. If any miscellaneous instructions are fetched after the system call (i.e., instructions not associated with the system call—not those fetched commencing at the predicted address), they are suppressed. However, in accordance with one aspect, the instructions fetched beginning at the predicted address, referred to herein as the instructions associated with the system call or other selected instruction, are decoded based on the predicted MSR, but further processing is suppressed. For instance, these instructions are held at dispatch until an indication is received to dispatch them. Processing then returns to STEP 600.

In one embodiment, only one level of prediction of the selected instruction is performed speculatively (i.e., when one selected instruction had been predicted, further selected instructions occurring in the instruction stream will not be processed predictively until the first predicted selected instruction has completed its execution). In another embodiment, multiple levels of prediction are performed.

The system call instruction continues processing in the pipeline, and eventually, reaches the execute stage, such as branch execution. Details regarding one embodiment of execution of the system call instruction (i.e., when the system call instruction reaches the execute stage) are described with reference to FIG. 7. Initially, a determination is made by the branch execution unit as to whether the system call instruction was received from the issue/dispatch logic, INQUIRY 700. If not, then conventional processing is performed, STEP 702. However, if the system call instruction was received from the issue/dispatch logic, then the MSR bits and the next fetch address (i.e., the effective address of the instruction following the system call instruction) are obtained from the instruction definition, STEP 704.

Additionally, the exception state is updated, STEP 706. For example, a register (e.g., SRR0) is updated to include the next fetch address to use after a return from system call, and another register (e.g., SRR1) is updated to include the MSR bits to use after a return from the system call (e.g., the current non-speculative MSR state prior to MSR updates in accordance with the current instruction). Further, the non-speculative MSR is updated with the MSR obtained in accordance with the instruction definition, STEP 708. Additionally, other state is updated based on, for instance, the particular architecture definition, in which the state is updated based on values obtained, for instance, using one or more instructions or accessing specified locations of memory.

Then, a determination is made as to whether the predicted MSR bits correspond to the architectural MSR bits from the instruction definition, INQUIRY 710. If they do correspond, then a further determination is made as to whether the predicted next fetch address (e.g., the predicted address) corresponds to the architectural next fetch address (NIA) from the instruction definition, INQUIRY 712. If there is correspondence amongst the MSR bits and the fetch address, then instructions held at dispatch are unblocked, STEP 714, and the instruction is completed, STEP 716. Processing then returns to INQUIRY 700.

However, if either the predicted MSR bits do not correspond to the architectural MSR bits or the predicted address does not correspond to the architectural address, then the misprediction is handled, STEP 720. For instance, the instructions in the pipeline after the current instruction are flushed, STEP 722, and the architectural MSR bits and the fetch address are transmitted to, for instance, the instruction fetch unit, STEP 724. Instruction fetch is then restarted, STEP 726, and processing continues at INQUIRY 700. This concludes one embodiment of the system call execution.

As described herein, a capability is provided in which, in one aspect, branch prediction logic is used to detect a system call instruction, and to predict an address for the system call instruction that specifies a location at which to begin fetching instructions for the system call instruction. Further, a privilege level for those fetched instructions is also predicted.

In one aspect, a system call entry instruction is detected by branch prediction logic, and is handled as a predicted branch. Prediction is typically straight-forward, since most system call entry instructions are unconditional, i.e., always taken. In an instruction set architecture (ISA) with conditional system call instructions, a directional prediction is made in order to determine whether a system call (or TRAP or other similar instruction) should be performed and a prediction is updated based on a system call instruction.

Figure 7:
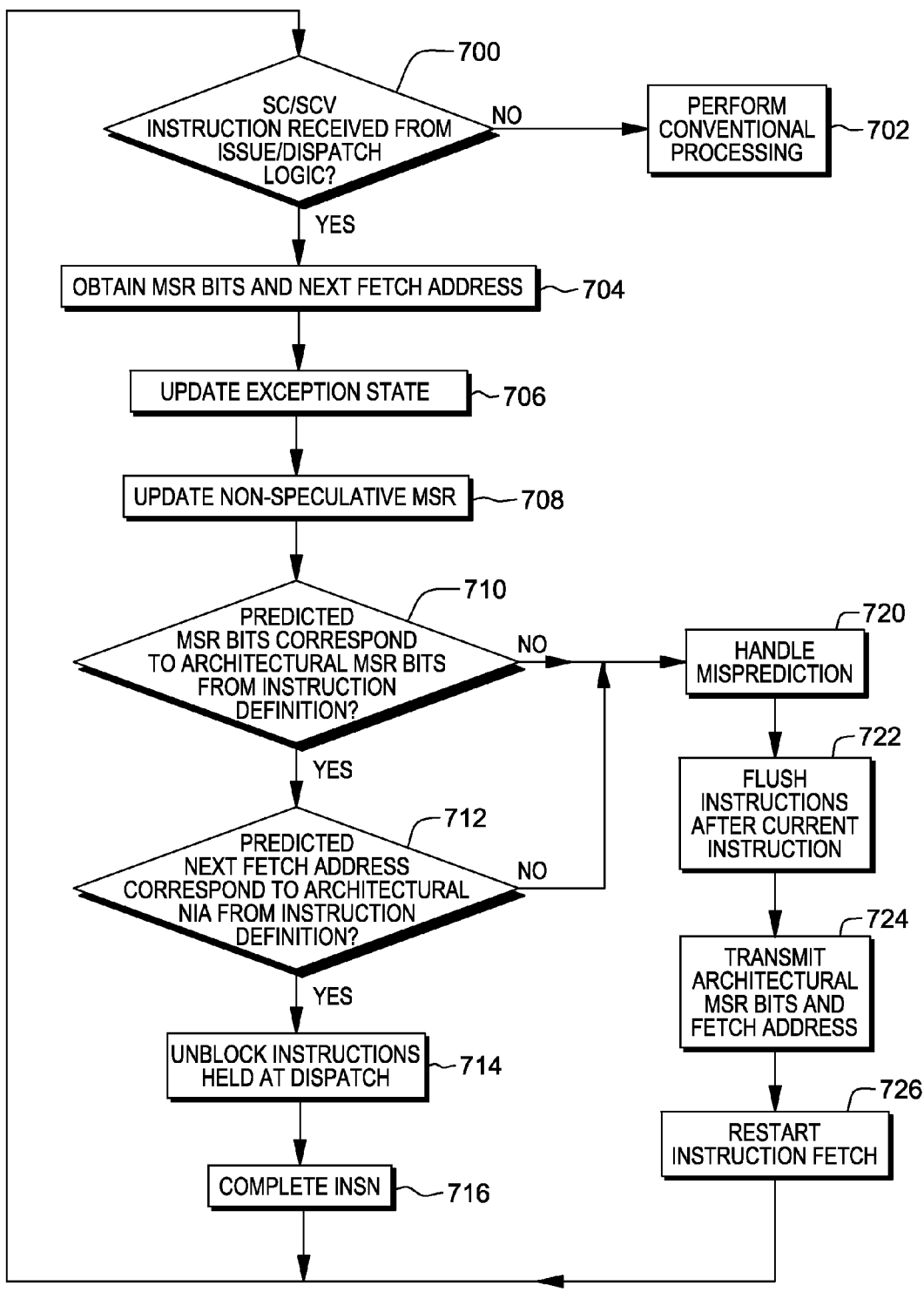
FIG. 7 depicts one embodiment of the logic to execute the system call instruction.

While FIG. 7 has been described with reference to execution occurring in the branch execution unit, in another embodiment, the technique of FIG. 7 is performed in another execution unit different from the branch execution unit, or collaboratively by a plurality of execution units, optionally including or not including the branch execution unit.

In one aspect, a branch predictor is modified to predict the new privilege level of the target of the system call instruction. Based on a system call instruction, the predictive privilege state is stored. In one aspect, when a branch (or other) flush occurs, the predictive state is updated to the predictive state of the privilege level at the point in the instruction stream to which the flush is associated.

As one embodiment, a separate predicted privilege level is maintained in the fetch/decode logic, while a non-predicted privilege level is maintained elsewhere, e.g., in the ISU. A check to ensure correct speculative fetch and decode with respect to the predicted privilege level compared to the non-speculative level is performed to ensure correct execution for all instructions. For instance, the speculative privilege level associated with at least one instruction is validated by comparing a speculative privilege level to a non-speculative level. If validation is unsuccessful, corrective action is taken.

As described above, in one implementation, a predictor stack is used to maintain a return address for the system call instruction. Previously, this was not done since return from system call or exception instructions can change the processor privilege state. However, in accordance with one aspect, the maintenance of return addresses is enabled by augmenting predictor stacks with predictive privilege state, by tagging predictor stacks with predictive privilege state, or both. Furthermore, in one aspect, logic is provided to check the predicted privilege state in conjunction with at least one instruction.

In one embodiment, when a system call entry instruction is detected, a return address is placed on a predictor stack. Furthermore, in one embodiment, a privilege state and, optionally, additional MSR state to enter is added to the return address entry. Additionally, in one embodiment, an indicator marking that the entry has been placed by a system call entry instruction is included in the entry. In this context, the privilege state is considered predictive because the return is predictive. It is not necessarily known that the processing will return to the return address, and what privilege level and/or other MSR state the operating system will indicate upon performing a return from interrupt or return from system call. The return depends, for instance, on processing in the pipeline.

Figure 8:
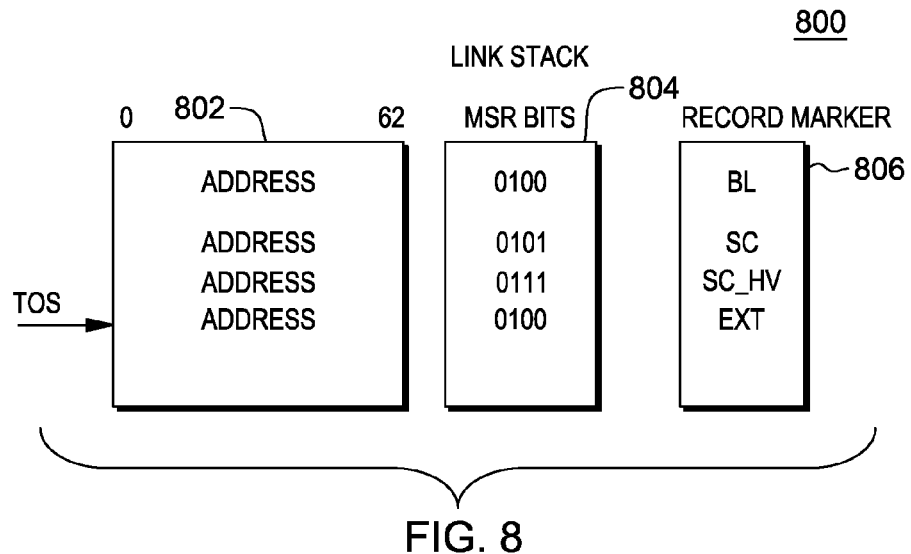
FIG. 8 depicts one example of a predictor stack used in the front-end execution of the system call instruction.

One example of a predictor stack used to hold the return address is described with reference to FIG. 8. As one example, a predictor stack 800 is implemented as a last-in-first out (LIFO) link stack. The top of the stack is indicated by TOS. In one embodiment, the stack includes a plurality of addresses 802, as well as state information, such as the current MSR bits 804 for each address, and a record marker 806. The record marker is optional, in one embodiment, and it provides a capability to track who created the record on the link stack. As examples, BL refers to branch link; SC refers to system call, such as a system call to the operating system; SC_HV refers to a system call to the hypervisor; and EXT refers to an external interrupt.

In some embodiments, some instructions will use a subset of the fields available in a link stack. Thus, for example, a branch to link instruction may be predicted by obtaining a predicted subroutine return address, without obtaining updated MSR state, as the branch to link instruction is not specified to alter the MSR state in accordance with at least one instruction set specification, such as the Power ISA v2.07.

In accordance with one embodiment, when a record marker is present, a record marker is obtained in conjunction with a predicted return address and MSR state. In accordance with one embodiment, the record marker is compared with an instruction being processed, such that only BL records reflecting a prediction record generated by the branch and link instruction are used to predict a return address to a branch to link instruction; only SC records reflecting a system call to the operating system will be used by a return from system call from the operating system; only SC_HV records reflecting a system call to the hypervisor will be used by a return from system call from the hypervisor; and only EXT records created by an external asynchronous interruption will be used by a return from external interrupt instruction, as examples. In other embodiments, a return from system call may be used to return from either an operating system or a hypervisor, and either record type will be accepted as a permissible predictor. In yet another embodiments, these system calls will have the same record marker. In yet other embodiments, some or all of an operating system call (system call to operating system), a hypervisor call (system call to hypervisor) and an external asynchronous exception can be completed by the same return instruction. In such an embodiment, all markers created corresponding to a shared return will be accepted as a permissible predictor. In yet another embodiment, these system calls and/or interrupts will have the same record marker. Many variations are possible.

As other embodiments, the stack may be tagged with the state information in addition to or in lieu of including it on the stack.

In a further aspect, external asynchronous interrupts can also employ one or more aspects of the predictive capability described herein to accelerate returns from external interrupts. This includes, for instance, pushing a return address on a predictor stack on an external exception entry; and on external exception exit, fetching the address early using, for instance, a return from interrupt instruction, as described herein.

Figure 9:
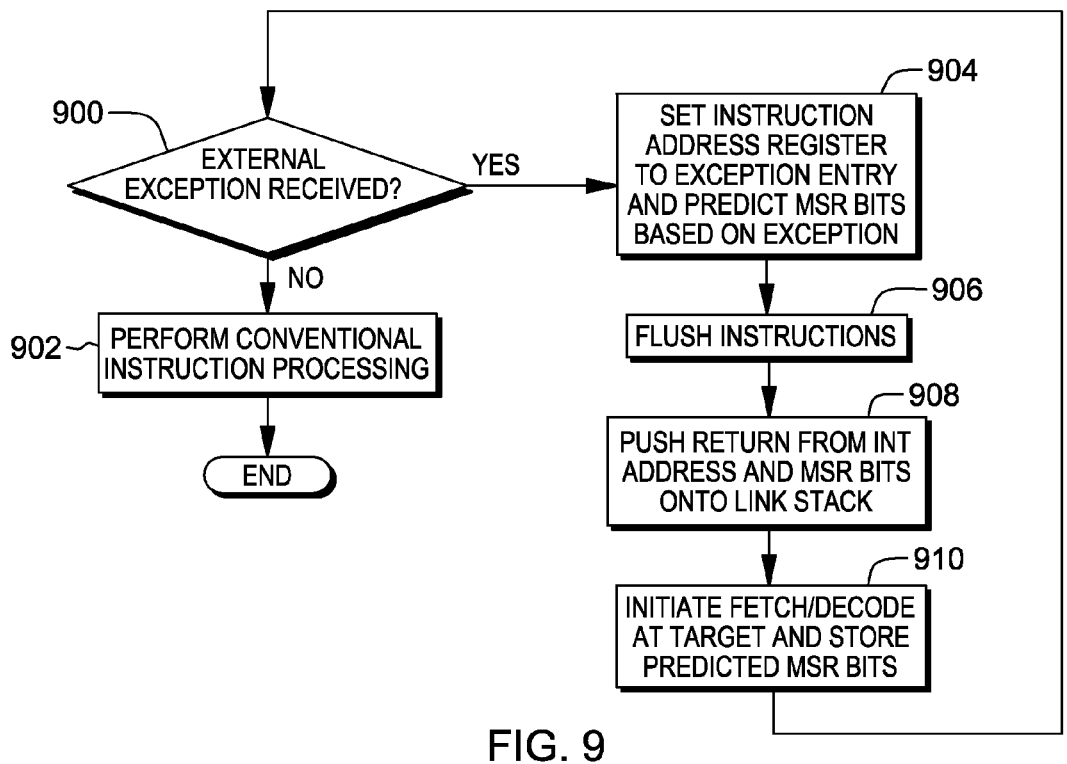
FIG. 9 depicts one embodiment of front-end execution of an asynchronous exception.

One embodiment of front-end execution for an external asynchronous interrupt is described with reference to FIG. 9. Initially, a determination is made by, for instance, the fetch/decode unit as to whether an external exception was received, INQUIRY 900. If not, conventional instruction processing is performed, STEP 902. In a further embodiment, other checks may be made to determine if the instruction is another type of selected instruction.

Otherwise, the program counter in the instruction address register is set to the exception entry address, STEP 904. This value may be obtained from a constant, an interrupt vector register or memory vector, etc., as examples. Further, the MSR indicators are predicted based on the exception.

Thereafter, the instructions in the pipeline are flushed, STEP 906. Further, in one embodiment, a return from interrupt address is pushed onto the predictor stack, as well as the current MSR bits, STEP 908. In one embodiment, the current MSR bits reflect the non-speculative MSR bits 536 of FIG. 5. Then, a fetch at the exception entry address is initiated and the predicted MSR bits are stored in the speculative MSR, STEP 910. The instructions fetched, beginning at the exception entry address, are decoded. Processing then continues to INQUIRY 900.

In at least one embodiment, additional state is updated in accordance with a conventional definition of exception processing in accordance with an architecture. This state includes, but is not limited to, non-speculative global MSR bits (e.g., the MSR bits 456 of FIG. 5), as well as other non-speculative state such as an architected return from exception address in a first register (e.g., an SRR0 register) and an architected return from exception MSR state in a second register (e.g., an SRR1 register).

As described above, in one embodiment, the predictive capability includes pushing return information on a predictor stack to facilitate returns from the selected instructions. The returns are provided by a return from system call instruction either by the operating system or a hypervisor, and/or a return from an asynchronous interrupt by either the operating system or hypervisor, as examples. These instructions are referred to herein, for convenience, as selected return instructions.

With the selected return instructions, the predictor stack prediction is checked, in one example, by checking the MSR and program counter. There is no redirect if there was a successful prediction.

Exiting a privileged state from a system call, hypervisor call or an asynchronous interrupt with a "return from interrupt" type instruction can impact performance because of the processing involved in a system call exit or a return from interrupt. Thus, in accordance with one aspect, system call returns, hypervisor returns or returns from interrupts are predicted. When a system call or an asynchronous (external) interrupt entry occurs, a return address is placed on a predictor stack. In one embodiment, return addresses for system calls or interrupts are placed on the function return predictor stack when a system call or an asynchronous interrupt is processed. In another embodiment, a special operating system, hypervisor or combined operating system/hypervisor predictor entry and/or stack is provided. As used herein, external interrupts and external exceptions are synonymous, which is consistent with many architectures.

In one embodiment, internal exceptions, internal interrupts, traps, or other such control transfers to supervisory software (e.g., the operating system or hypervisor) will be handled similar to one of a system call and an external interrupt, and includes, for instance, generating a prediction record on one of a function return predictor stack or a special operating system, hypervisor or combined operating system/hypervisor predictor entry and/or stack.

In one aspect, a system call return instruction or an interrupt return instruction is detected by branch prediction logic, and is handled as a predicted branch. A predictive address is obtained from a predictor stack to which a return address was stored. The return from system call or interrupt instruction is processed by, for instance, the branch execution unit, and the predictive state is checked against a non-speculative state at the in-order execution point. A check of the entered non-predictive state is performed, and if incorrectly predicted, subsequent instructions are flushed.

Most returns from system call or interrupt instructions in typical instruction set architectures (ISAs) are unconditional, i.e., always taken. In an ISA with conditional system call returns or returns from interrupt instructions, a directional prediction is made and updated based on a return from system call or interrupt instruction.

In one aspect, and beyond traditional branch prediction, a branch predictor is modified to predict the new privilege level of the target of a change of control flow (such as due to a system call exit or return from interrupt instruction). Based on a system call exit instruction or a return from interrupt instruction, the predictive privilege state is updated (i.e., stored). In one embodiment, the new predictive state is obtained directly from the instruction. In another embodiment, a predictor table predicts the state, e.g., when the state is provided in a register.

When a branch (or other) flush occurs, in one embodiment, the predictive state is updated to the predictive state of the privilege level and/or other MSR state at the point in the instruction stream to which the flush is associated. In another embodiment, when flushes are associated with a non-speculative privilege level and/or other MSR state (e.g., non-speculative MSR 536 of FIG. 5), the predictive privilege level and/or other MSR state are updated to a non-speculative privilege level and/or other MSR state associated with the flush point.

A separate predicted privilege level and/or other MSR state is maintained in the fetch/decode logic. A non-predicted privilege level and/or other MSR state is maintained elsewhere, e.g., the ISU. A check to ensure correct speculative fetch and decode with respect to the predicted privilege level and/or other MSR state to the non-speculative privilege level and/or other MSR state is performed to ensure correct execution for all instructions.

In one embodiment, the returns from interrupt and system call exit are the same instructions. In this case, system call entry and asynchronous interrupt entry produce a similar prediction record on the same predictive structure. Return from privileged code (e.g., the operating system and/or hypervisor) uses the generated entry regardless of the nature of how the entry was generated to process the exit.

In one embodiment, all instructions with a predictive state are held (e.g., in dispatch, issue or other queues and locations) until the predictive state has been validated. In at least one embodiment, some instructions (e.g., those relying on privileged state and mode) are held, while others, such as add, subtract etc. continue to be executed. In at least one embodiment, where each instruction is tagged with its speculative state, some instructions dependent on speculative state are executed based on their speculated privileged state, if and only if they can be undone/rolled back when the speculative instruction needs to be flushed, e.g., when the speculative state was mispredicted. In one embodiment, results can be flushed when only renamed state is updated, such as the result of loads and stores, and instructions causing exceptions are held when executed speculatively, and re-executed when they become non-speculative.

In one embodiment, a prediction is made based on a return from interrupt instruction, but then the return from interrupt instruction is microcoded. Typically, the same instruction causes the prediction and, later in the pipeline (i.e., in a pipeline stage further removed from instruction fetch), the prediction check. However, in accordance with one aspect, the original instruction associated with the microcode entry causes the prediction (for both address and some MSR bits), and another instruction issued by the microcode performs the checking of the prediction only. If either the program counter address or MSR were mispredicted, the program counter is redirected and the MSR is reset.

Figure 10A:
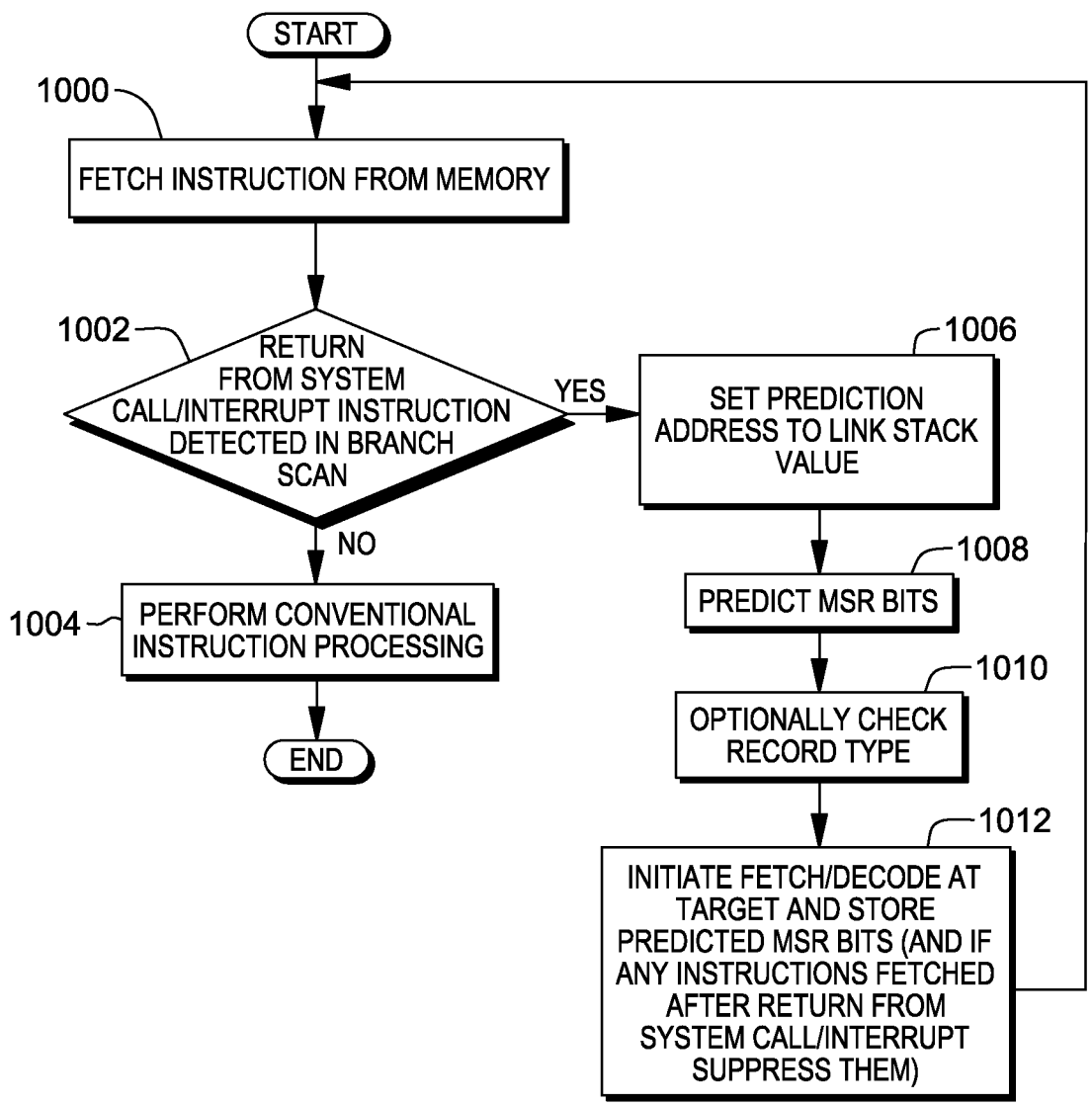
FIG. 10A depicts one embodiment of front-end execution of a return from system call or a return from interrupt instruction.

One embodiment of the processing associated with a selected return instruction is described with reference to FIG. 10A. Initially, an instruction is fetched from memory into the instruction fetch unit, STEP 1000. Then, a scan, such as a branch scan, is performed to predict whether the instruction is a return from system call or return from interrupt instruction, INQUIRY 1002. This prediction is made by, for instance, examining the opcode of the instruction and/or a parameter associated with the instruction. If it is not a selected return instruction, then processing performs as conventional, STEP 1004. In a further embodiment, other checks may be made to determine if the instruction is another type of selected instruction.

However, if it is predicted that a selected return instruction is to be executed, then a prediction address is set to the address saved on the predictor stack, and this predicted address is saved in the program counter, STEP 1006.

Additionally, if a selected return instruction is predicted, a further prediction is made as to the value of one or more of the MSR bits, such as the privilege level (e.g., operating system level), instruction relocation, data relocation, etc. for the instruction at the predicted address, STEP 1008. In one example, this state is obtained from the entry on the predictor stack corresponding to the address. In another embodiment, the predicted MSR state may be derived from the instruction being processed, in accordance with an instruction set architecture specification for at least one instruction set architecture.

Further, optionally, the record type from the predictor stack is checked to determine if the prediction is correct, STEP 1010. For instance, if it is a return from system call, the check confirms that the record being used to predict the return was created by an entry to system call, etc. If the prediction is incorrect, recovery is performed, as predefined. (In one embodiment, recovery is handled as a misprediction. In another embodiment, instruction fetch is suspended until recovery has been performed.) Additionally, a fetch at the predicted address is initiated and the predicted MSR bits are stored in the speculative MSR, STEP 1012. Decode is also initiated for the fetched instructions. If any miscellaneous instructions are fetched after the selected return instruction, (i.e., instructions not associated with the return instruction—not those fetched commencing at the predicted address), they are suppressed. However, in accordance with one aspect of one embodiment, the instructions fetched beginning at the predicted address, referred to herein as the instructions associated with the system call return or other selected instruction, are decoded based on the predicted MSR, but further processing is suppressed. For instance, these instructions are held at dispatch until an indication is received to dispatch them. Processing then returns to STEP 1000.

Figure 10B:
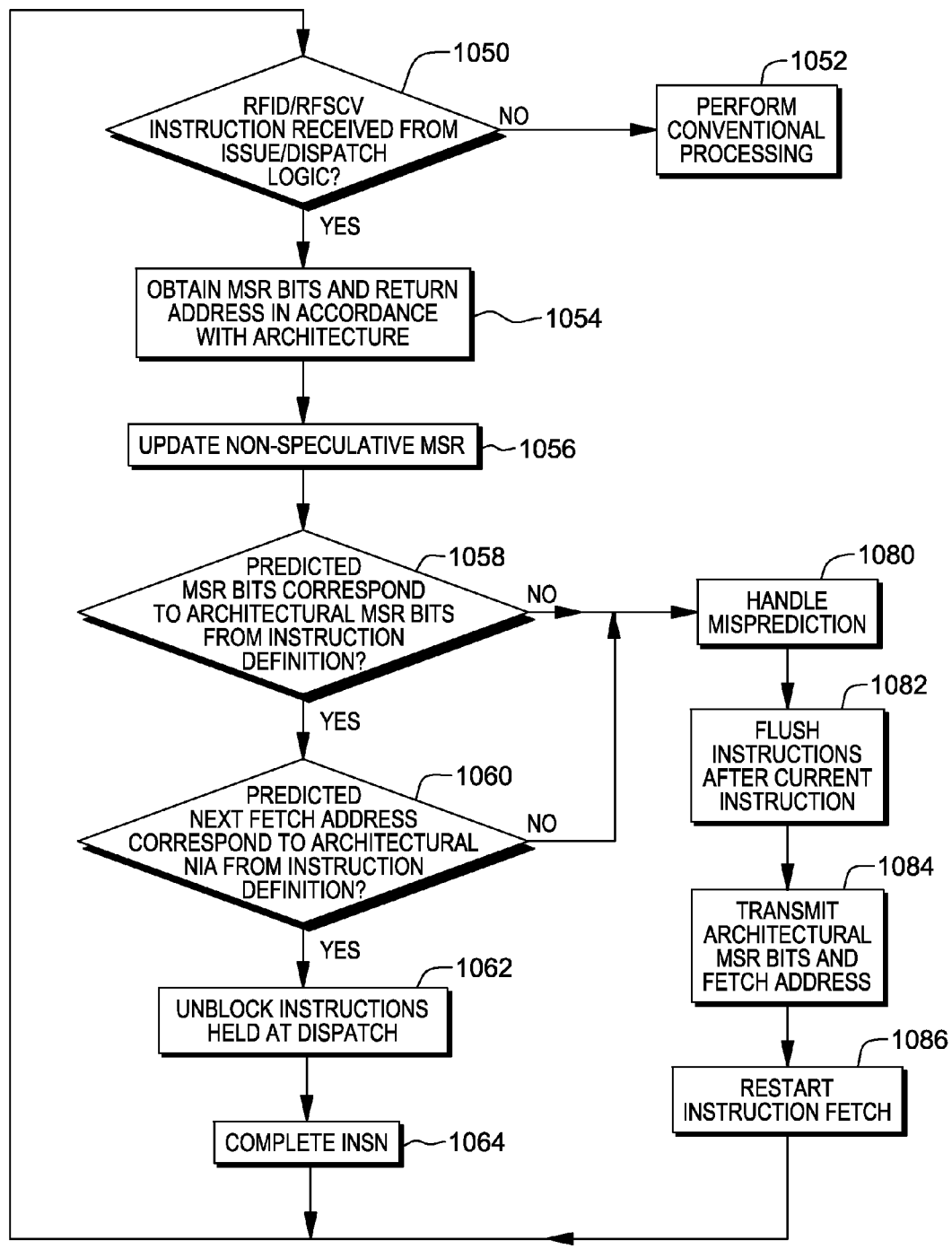
FIG. 10B depicts one embodiment of the logic to execute the return from system call or the return from interrupt instruction

The return instruction continues processing in the pipeline, and eventually, reaches the execute stage, such as branch execution. Details regarding one embodiment of execution of the return instruction (i.e., when the return instruction reaches the execute stage) are described with reference to FIG. 10B. Initially, a determination is made by the branch execution unit as to whether the return instruction was received from the issue/dispatch logic, INQUIRY 1050. If not, then conventional processing is performed, STEP 1052. However, if the return instruction was received from the issue/dispatch logic, then the MSR bits and the return address are obtained from, for instance, the SRR1 and SRR0 registers, respectively, STEP 1054.

Additionally, the non-speculative MSR is updated with the MSR obtained from the instruction, STEP 1056.

Then, a determination is made as to whether the predicted MSR bits correspond to the architectural MSR bits from the instruction definition, INQUIRY 1058. If they do correspond, then a further determination is made as to whether the predicted return address (i.e., the return address of the system call return from which the fetch is performed) corresponds to the architectural return address from the instruction definition, INQUIRY 1060. If there is correspondence amongst the MSR bits and the address, then instructions held at dispatch are unblocked, STEP 1062, and the instruction is completed, STEP 1064. Processing then returns to INQUIRY 1050.

However, if either the predicted MSR bits do not correspond to the architectural MSR bits or the address does not correspond to the architectural address, then the misprediction is handled, STEP 1080. For instance, the instructions in the pipeline after the current instruction are flushed, STEP 1082, and the architectural MSR bits and the address are transmitted to, for instance, the fetch unit, STEP 1084. Instruction fetch is then restarted, STEP 1086, and processing continues at INQUIRY 1050. This concludes one embodiment of the return execution.

In at least one embodiment, additional corrective actions are performed in response to recovering a subroutine return predictor stack in response to a misprediction having occurred.

In one embodiment, when a return from system call instruction is processed, a predictive privilege state is entered based upon the predictive privilege state in the return predictor state. Further, in one embodiment, a predictive privilege state and/or other MSR state is compared against a privilege state and/or other MSR state in the system call exit instruction. If a miscompare is detected, a prediction is not processed, and the return from system call is performed non-speculatively. When a branch prediction is performed for a branch using a return predictor stack, and the return predictor stack indicates the selected entry was made by a system call entry, the branch is not performed predictively. When a branch prediction is performed for a system call exit using a return predictor stack, and the return predictor stack does not indicate the selected entry was made by a system call entry, the system call exit is not performed predictively.

In one embodiment, when an asynchronous or external interrupt is entered, a return address is placed on a predictor stack. Furthermore, a predicted privilege state and/or other MSR state to enter is added to the predictive return from interrupt address entry. When a return from interrupt instruction is processed, in one embodiment, a predictive privilege state and/or other MSR state is entered based upon the predictive privilege state and/or other MSR state in the return predictor state. Further, in one embodiment, a predictive privilege state and/or other MSR state is compared against a privilege state and/or other MSR state in the return from interrupt instruction. If a miscompare is detected, a prediction is not processed, and the return from interrupt is performed non-speculatively.

Further, in one embodiment, when an asynchronous or external interrupt is entered, an indicator marking that the entry in the predictor stack has been placed by an asynchronous/external interrupt is added to the predicted return address. When a branch prediction is performed for a branch using a return predictor stack, and the return predictor stack indicates the selected entry was made by an asynchronous/external interrupt entry sequence, the branch is not performed predictively. When a branch prediction is performed for a return from interrupt instruction interrupt exit using a return predictor stack, and the return predictor stack does not indicate the selected entry was made by an asynchronous or external interrupt entry sequence, the return from interrupt is not performed predictively.

When a return from interrupt and return from system call are performed by the same instruction, in one embodiment, system call entry and external interrupt entry generate different markers, but the return instruction access accepts either marker to perform a return speculatively. When return from interrupt and return from system call are performed by the same instruction, in another embodiment, system call entry and external interrupt entry generate the same marker for the return address stack.

System call exits and returns from interrupt instructions are routed to the branch execution unit to validate the prediction, and a recovery sequence (e.g. a flush to the correct address with the correct predictive privilege state) occurs when validation is not successful. In another embodiment, this is handled by another execution unit, or a combination of more than one execution unit. In one embodiment, when no predictive execution has occurred due to a mismatch of predicted states, or return entry marker record, the branch execution unit does not perform a validation, but executes the instruction directly. In at least one embodiment, direct execution corresponds to performing a recovery sequence, such as a flush to the correct address with the correct predictive state.

As indicated herein, at times, a flush of the pipeline is required or desired. For instance, if a branch predicted that a particular path was to be taken and that path was incorrect, then a flush is performed. In accordance with one aspect, if the incorrect path included predictively performing an instruction that alters the privileged level and/or other operating state, then the privilege level and/or other MSR state also needs to be changed, as described herein.

Figure 11:
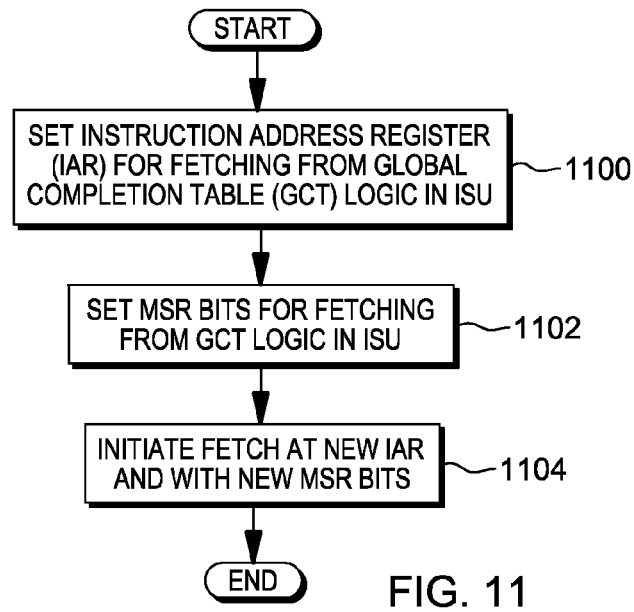
FIG. 11 depicts one embodiment of the logic to flush a pipelined processor.

One embodiment of logic associated with a flush is described with reference to FIG. 11. Initially, the instruction address register (IAR), is set to one or more addresses fetched from the global completion table (GCT) logic in the instruction sequence unit (ISU), STEP 1100. Additionally, the MSR bits are set to the values of the non-speculative MSR indicators associated with the global completion table, STEP 1102.

Further, a fetch is initiated at an address from the new instruction address register and with the new MSR bits, STEP 1104. The instruction fetched at the new address is processed based on the new state (e.g., new MSR bits). This concludes one embodiment of the flush logic.

Described in detail herein is a predictive capability that detects whether a selected instruction is to execute. Based on determining that the selected instruction is to execute, a prediction is made as to a predicted address for the selected instruction. Then, the instructions commencing at the predicted address are fetched and/or decoded prior to execution of the selected instruction. This enhances performance within the processor.

In one embodiment, the predictive capability manages MSR state in the instruction fetch and/or decode unit as speculative state. However, the master copy in the instruction sequence unit is still updated non-speculatively (at NTC, i.e., at the time when the instruction is non-speculative and next to complete and there are no instructions ahead of the present instruction updating the non-speculative state). In one embodiment, a predictor can optionally contain the new MSR bits tracked in the instruction fetch and/or decode unit and speculatively updated. If there is a flush, the MSR bits are transmitted in conjunction with the flush address.

Although one or more of the examples discussed above describe a system call issued by an operating system, one or more aspects are applicable to system calls or the like issued by the hypervisor. The hypervisor has, in one embodiment, a privilege level higher than both the operating system and application programs. For a hypervisor, a system call return typically returns to the operating system. One or more aspects described herein can also be used in conjunction with programs operating at other privilege levels beyond and in addition to application, operating system and hypervisor levels.

While one or more aspects have been described with respect to instructions used by the Power ISA, in other embodiments, instructions of other architectures may be used. For instance, a system call in accordance with another system call instruction (such as, for example, the SVC instruction in accordance with the z/Architecture for System z), with another register tracking processor state and privilege levels (such as, for example, a PSW (Program Status Word) register in accordance with the z/Architecture for System z) may be used; and/or other instructions, registers and facilities in accordance with instruction set architectures implemented by a microprocessor.

As will be appreciated by one skilled in the art, one or more aspects may be embodied as a system, method or computer program product. Accordingly, one or more aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 12:
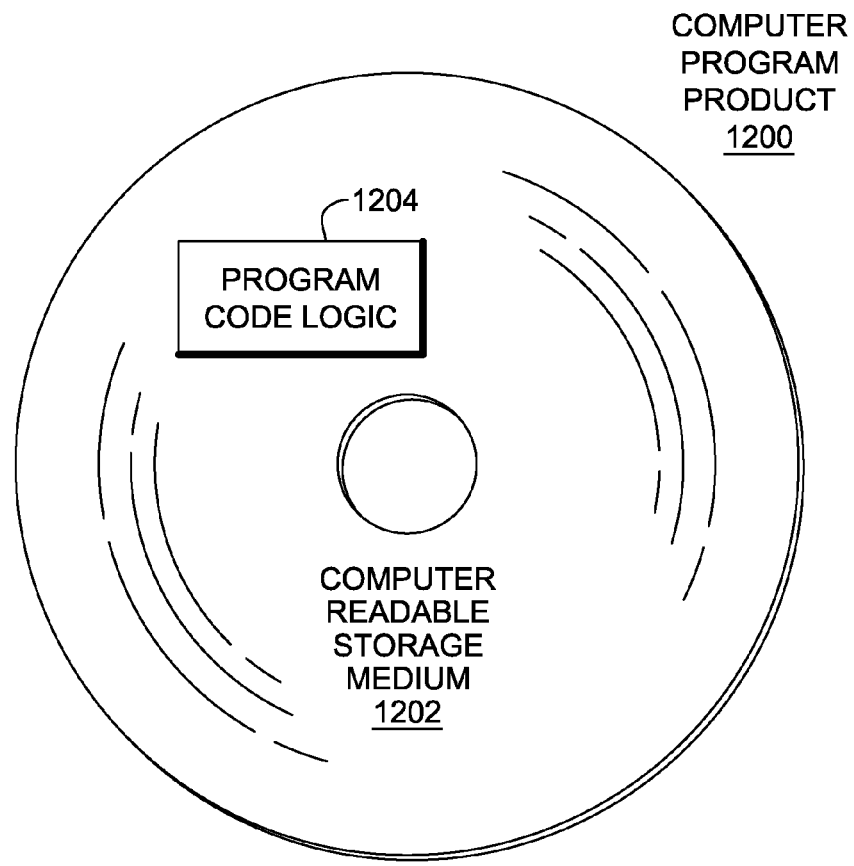
FIG. 12 depicts one embodiment of a computer program product incorporating one or more aspects.

Referring now to FIG. 12, in one example, a computer program product 1200 includes, for instance, one or more non-transitory computer readable storage media 1202 to store computer readable program code means or logic 1204 thereon to provide and facilitate one or more aspects.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, processing environments of other architectures can incorporate and use one or more aspects. Additionally, other instructions, including, but not limited to, other instructions that can alter the privilege level and/or other operating state can employ one or more aspects of the predictive capability. Further, other types of predictor data structures may be used, and/or additional, less or different information may be used. Additionally, structures other than an MSR, such as a program status word (PSW), or other types of structures may be used. Many variations are possible.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 13:
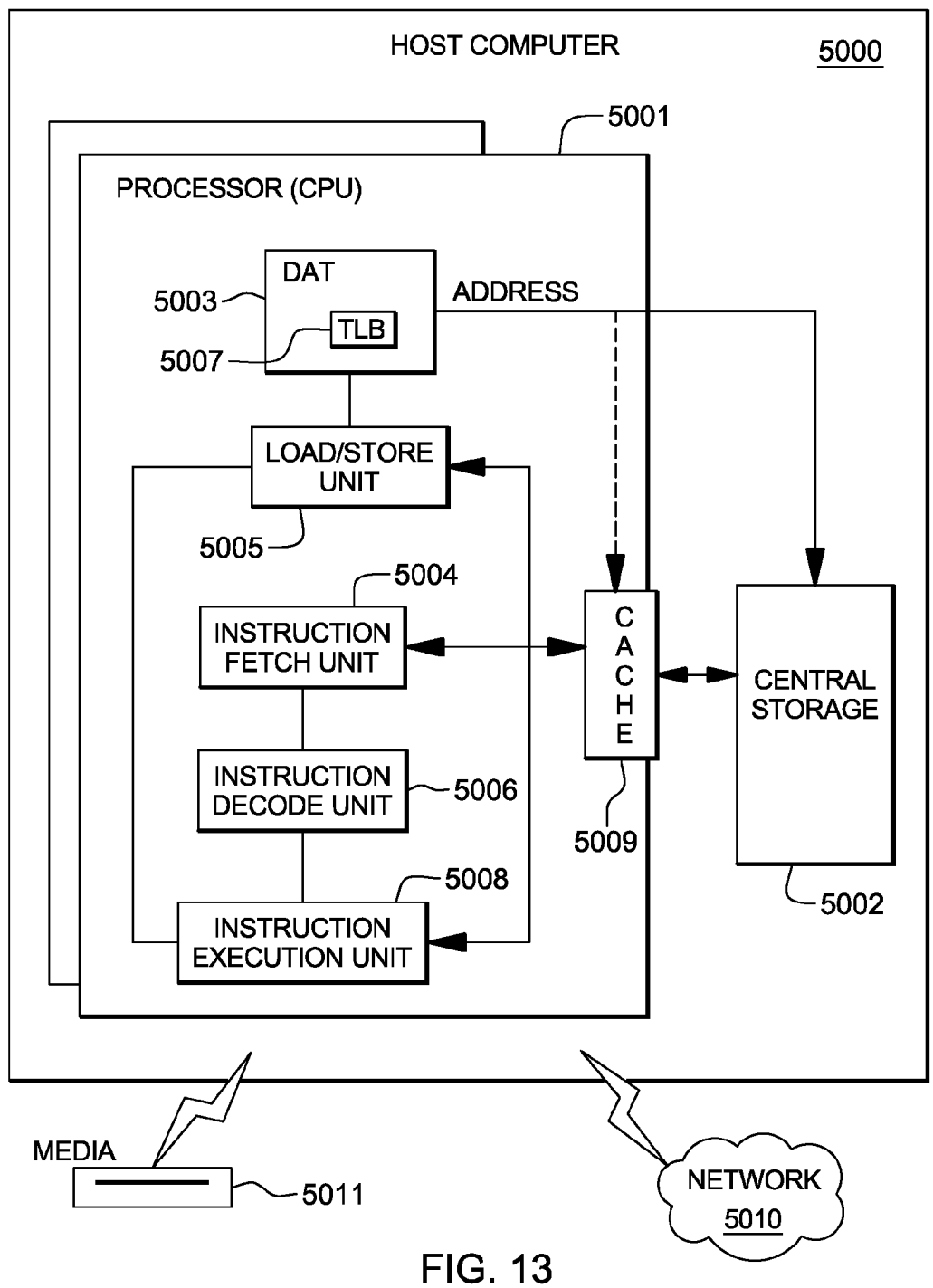
FIG. 13 depicts one embodiment of a host computer system to incorporate and use one or more aspects.

Referring to FIG. 13, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 13, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 14:
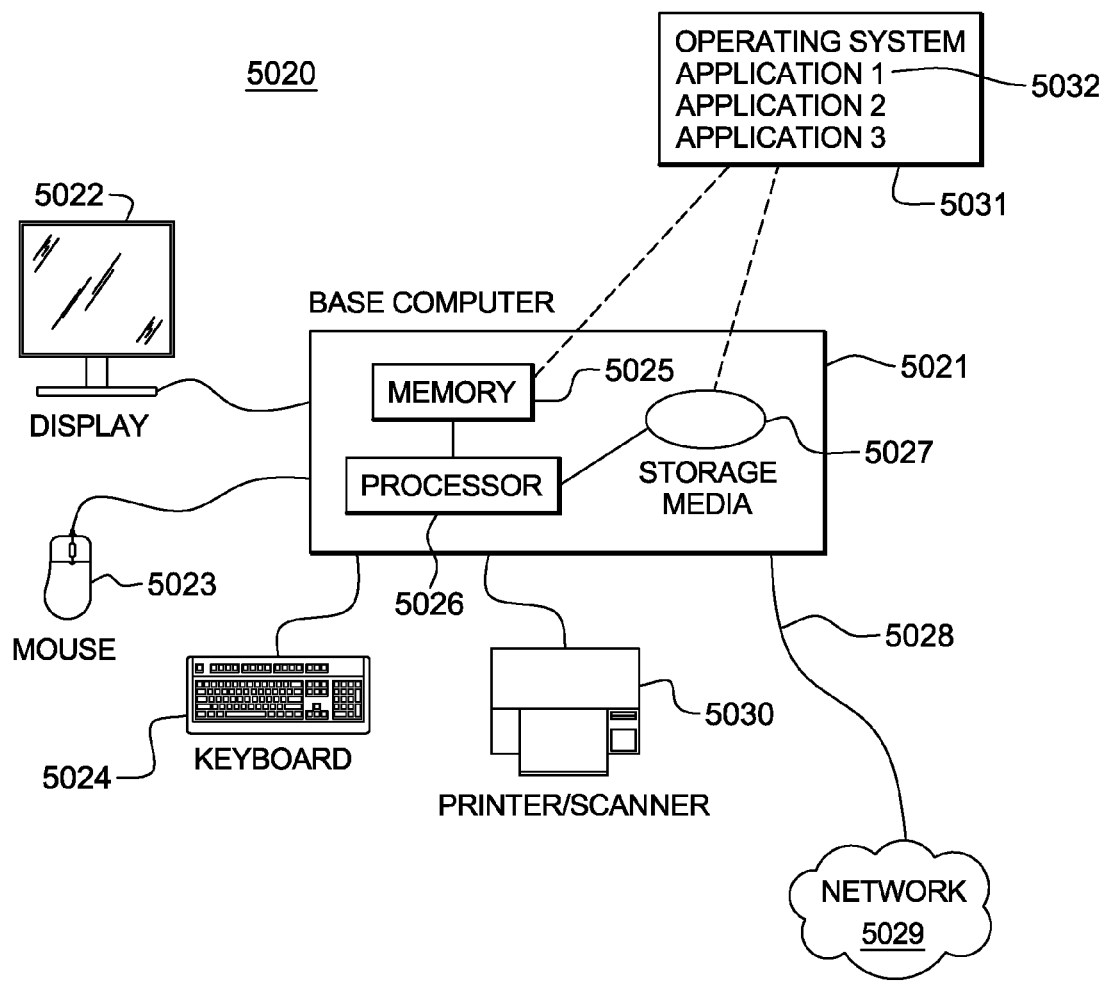
FIG. 14 depicts a further example of a computer system to incorporate and use one or more aspects.

FIG. 14 illustrates a representative workstation or server hardware system in which one or more aspects may be practiced. The system 5020 of FIG. 14 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 15:
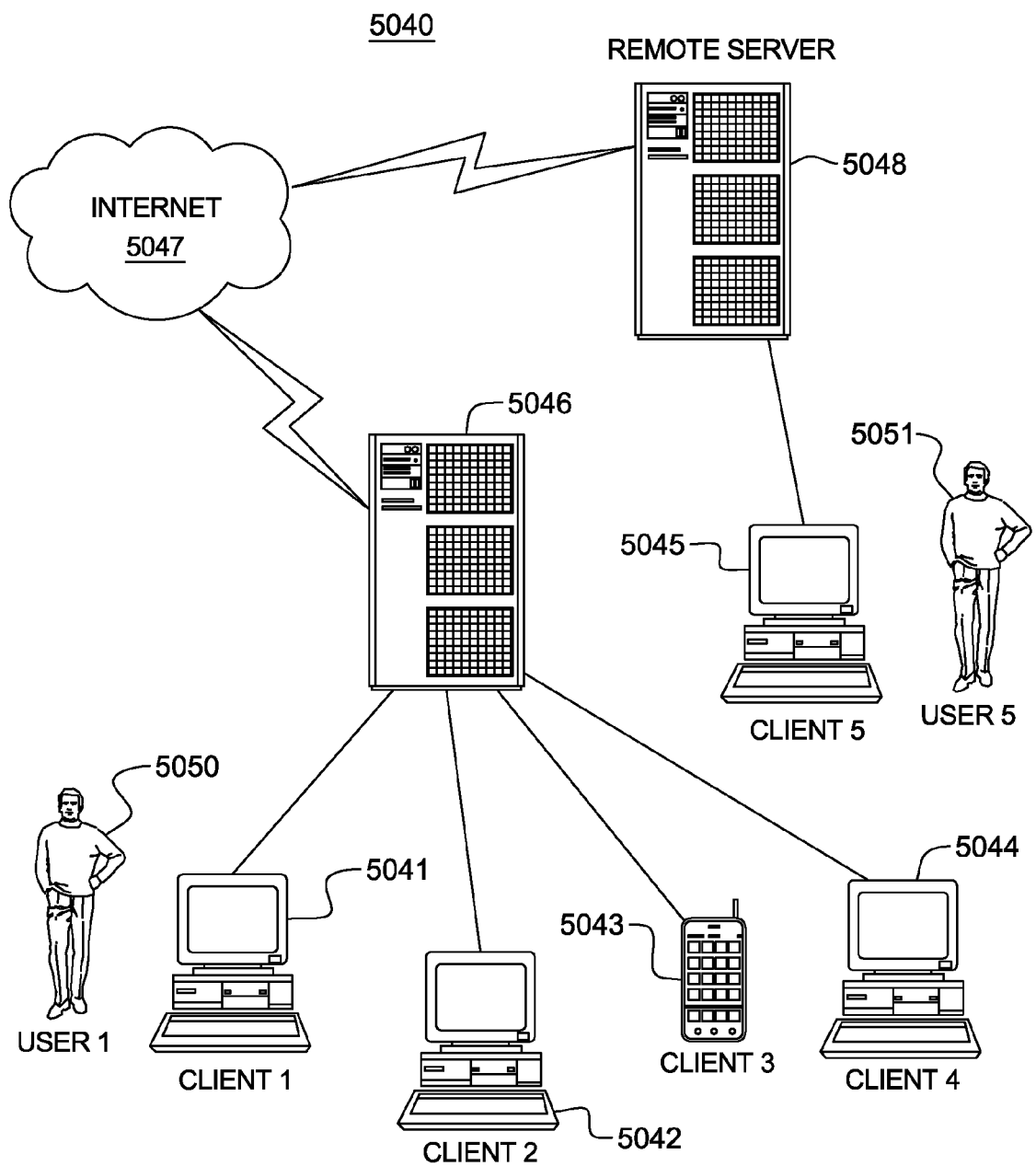
FIG. 15 depicts another example of a computer system comprising a computer network to incorporate and use one or more aspects.

FIG. 15 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 15, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 14 and FIG. 15, software programming code which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 16:
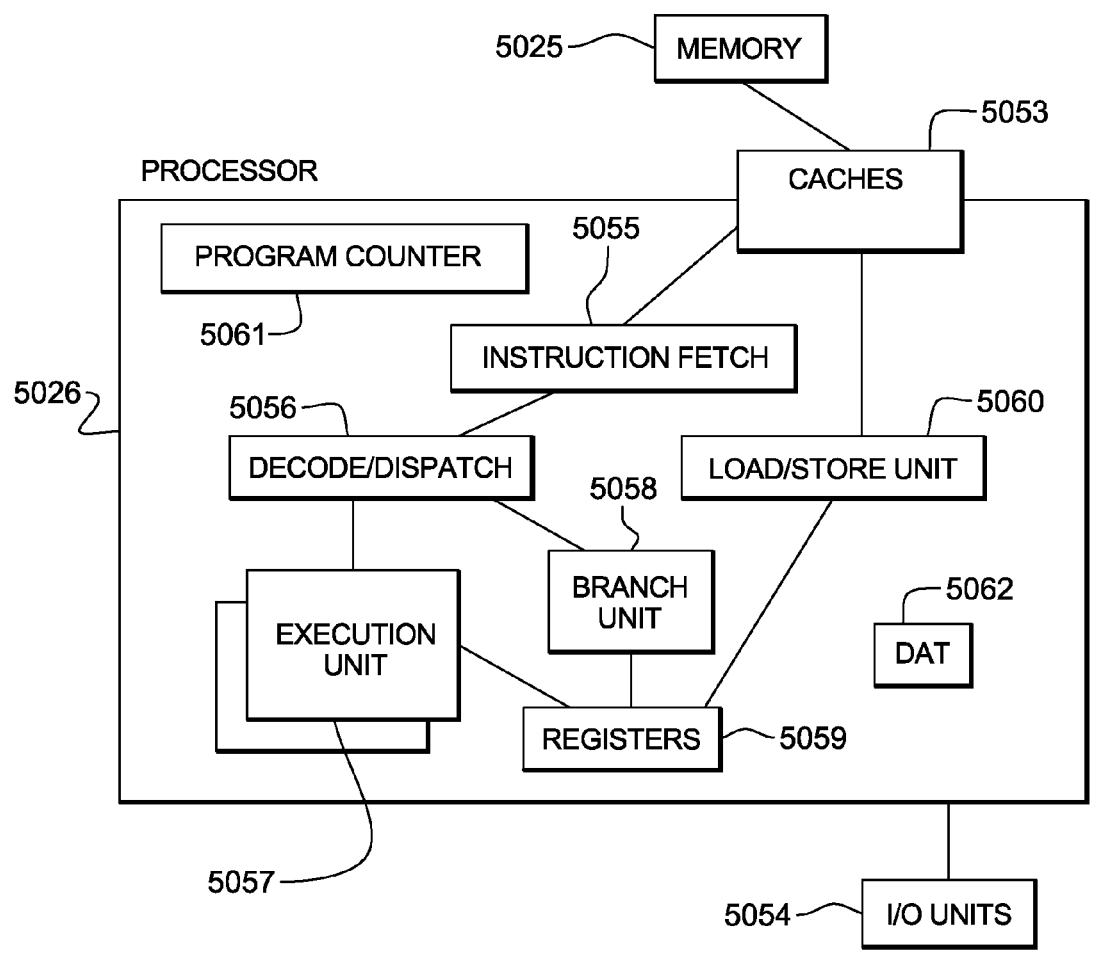
FIG. 16 depicts one embodiment of various elements of a computer system to incorporate and use one or more aspects.

Referring to FIG. 16, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 17A:
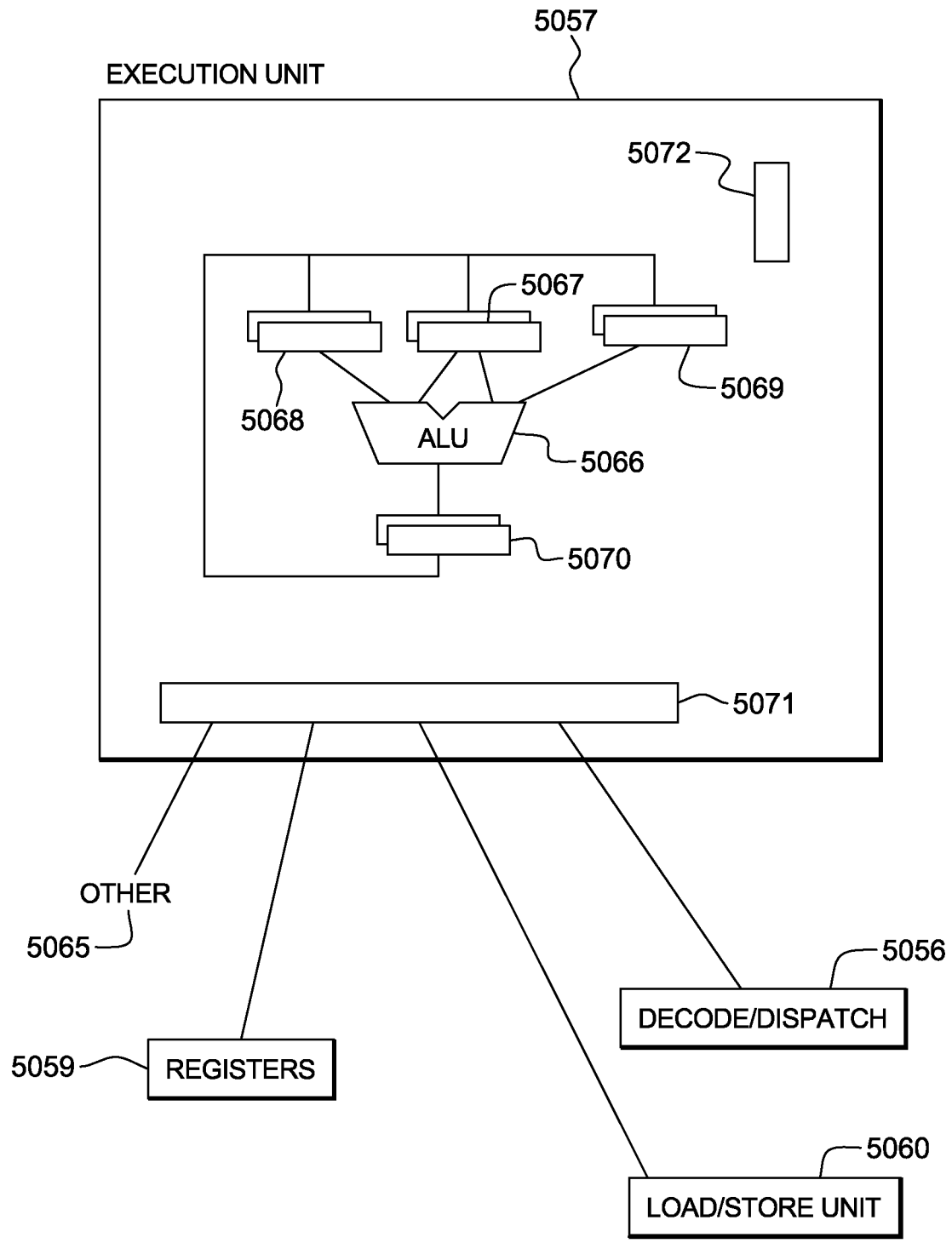
FIG. 17A depicts one embodiment of the execution unit of the computer system of FIG. 16.

A processor 5026 typically has one or more units 5057, 5058, 5060 for executing the function of the instruction. Referring to FIG. 17A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 17B:
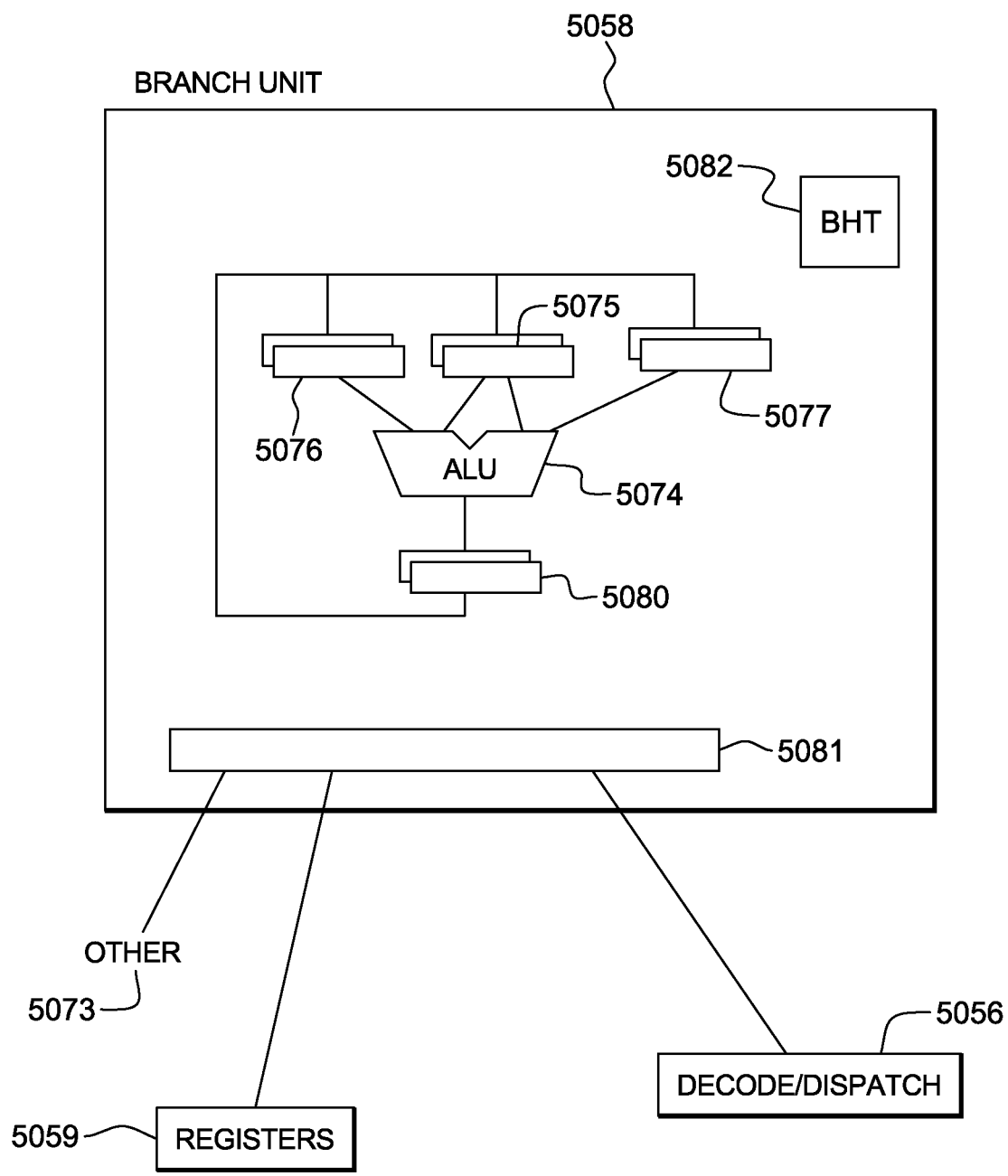
FIG. 17B depicts one embodiment of the branch unit of the computer system of FIG. 16.

Referring to FIG. 17B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 17C:
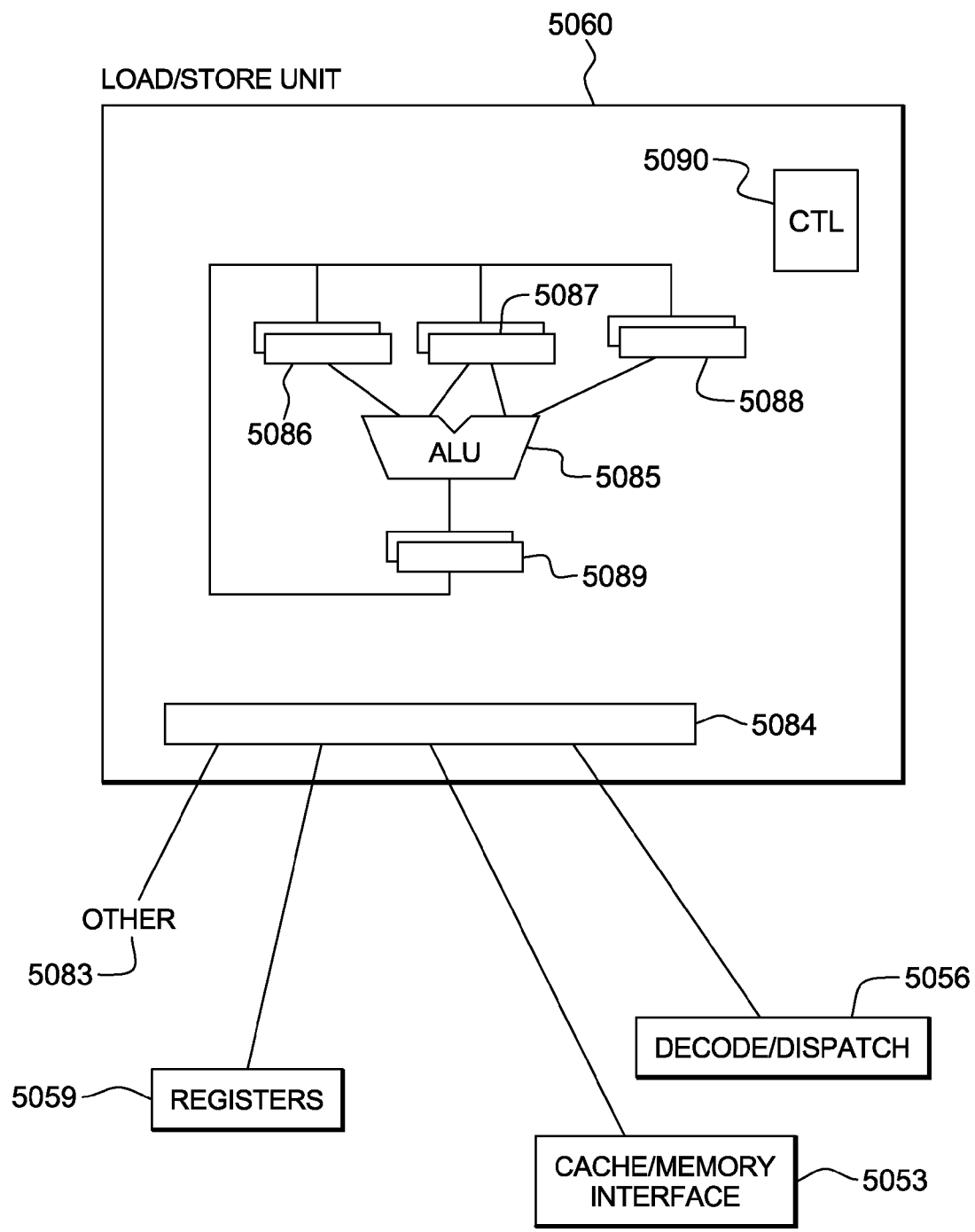
FIG. 17C depicts one embodiment of the load/store unit of the computer system of FIG. 16.

Referring to FIG. 17C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 16) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Letters Patent No. 5,551,013, entitled "Multiprocessor for Hardware Emulation", by Beausoleil et al.; and U.S. Letters Patent No. 6,009,261, entitled "Preprocessing of Stored Target Routines for Emulating Incompatible Instructions on a Target Processor", by Scalzi et al; and U.S.

Letters Patent No. 5,574,873, entitled "Decoding Guest Instruction to Directly Access Emulation Routines that Emulate the Guest Instructions", by Davidian et al; and U.S. Letters Patent No. 6,308,255, entitled "Symmetrical Multiprocessing Bus and Chipset Used for Coprocessor Support Allowing Non-Native Code to Run in a System", by Gorishek et al; and U.S. Letters Patent No. 6,463,582, entitled "Dynamic Optimizing Object Code Translator for Architecture Emulation and Dynamic Optimizing Object Code Translation Method", by Lethin et al; and U.S. Letters Patent No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 18:
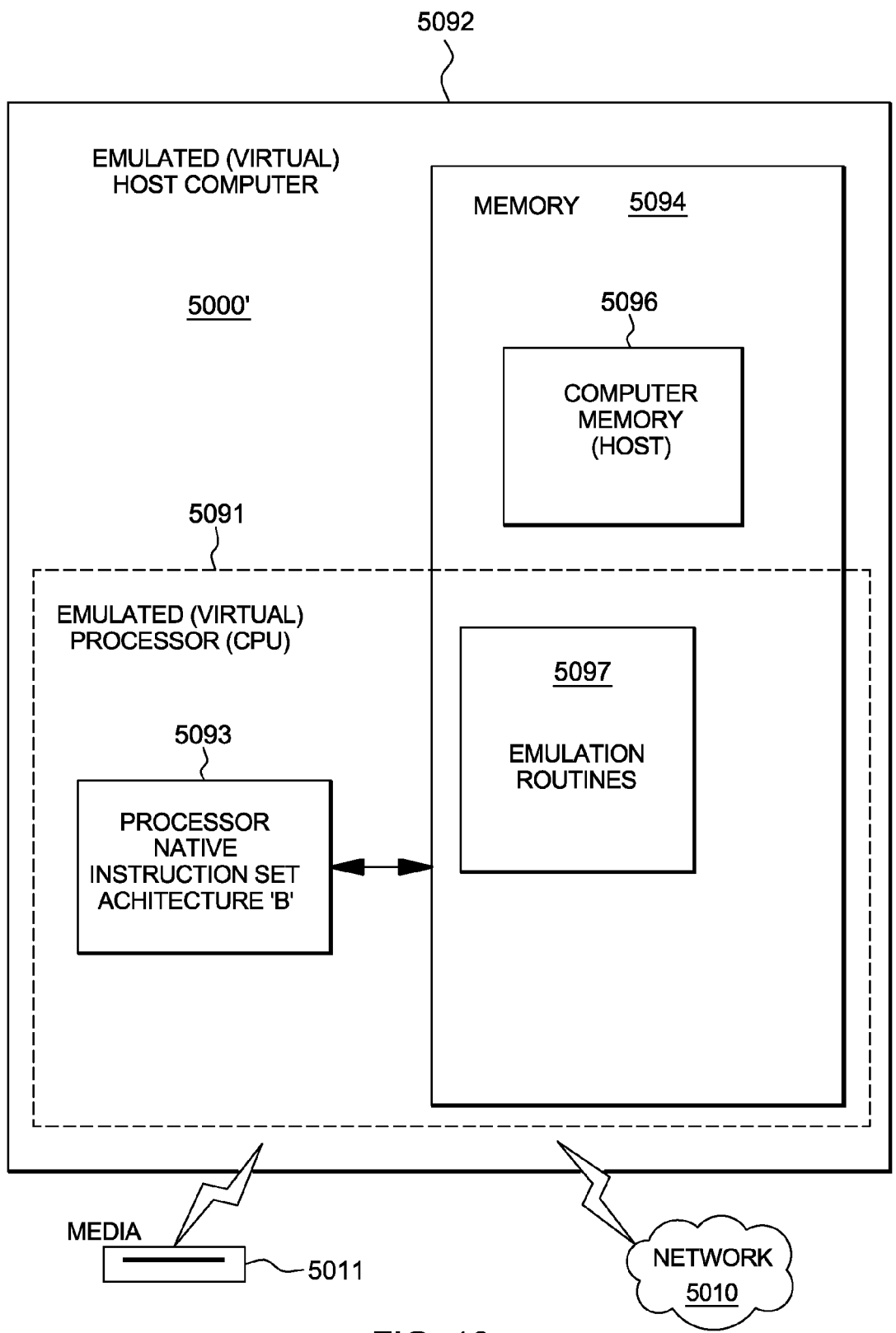
FIG. 18 depicts one embodiment of an emulated host computer system to incorporate and use one or more aspects.

In FIG. 18, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for facilitating processing within a processing environment, the computer program product comprising:
   a non-transitory computer readable storage medium readable by a processing circuit and storing instructions for execution by the processing circuit for performing a method, the method comprising:
     using a predictor data structure for pipelined processing by a pipelined processor, said predictor data structure comprising a predicted address to be used in return from execution of a selected instruction, and a predicted operating state associated with the predicted address, wherein the predicted operating state includes a privilege level of an instruction to be accessed at the predicted address;
     based on determining a selected return instruction is to be executed, obtaining from the predictor data structure the predicted address to which processing is to be returned; and
     based on determining the selected return instruction is to be executed, predicting a transitional operating state to be entered based on the predicted operating state stored in the predictor data structure, wherein at least one of the predicted address and the predicted transitional operating state are to be used to validate execution of the selected return instruction.

2. The computer program product of claim 1, wherein the selected instruction comprises one of a system call instruction, a hypervisor call instruction or an asynchronous interruption.

3. The computer program product of claim 2, wherein the method further comprises placing the predicted address and the predicted operating state corresponding to a future anticipated return on the predictor data structure, based on execution of the selected instruction.

4. The computer program product of claim 1, wherein the method further comprises validating execution of the selected return instruction, wherein the validating comprises:
   comparing at least a portion of the predicted transitional operating state with obtained operating state; and
   proceeding with execution of the selected return instruction, based on the comparing indicating a match; and
   performing recovery of the selected return instruction, based on the comparing indicating a discrepancy.

5. The computer program product of claim 4, wherein the proceeding with execution comprises:
   unblocking one or more instructions held at dispatch; and
   completing execution of the selected return instruction.

6. The computer program product of claim 4, wherein the performing recovery comprises:

performing a flush of the pipelined processor, the performing the flush providing a new fetch address and new speculative operating state;

based on performing the flush, initiating a fetch of an instruction at the new fetch address; and processing the instruction fetched at the new fetch address based on the new speculative operating state.

7. The computer program product of claim 1, wherein the predicted operating state is maintained in a decode unit of the pipelined processor, and is separate from a non-speculative operating state maintained in an execute unit of the pipelined processor.

8. The computer program product of claim 1, wherein the selected return instruction comprises one of a return from system call instruction, a return from hypervisor call instruction or a return from an asynchronous interruption.

9. The computer program product of claim 1, wherein the predictor data structure further comprises an indicator of a creator responsible for placing the predicted operating state in the data structure.

10. A computer system for facilitating processing within a processing environment, the computer system comprising:

a memory; and a processor in communications with the memory, wherein the computer system is configured to perform a method, said method comprising:

using a predictor data structure for pipelined processing by a pipelined processor, said predictor data structure comprising a predicted address to be used in return from execution of a selected instruction, and a predicted operating state associated with the predicted address, wherein the predicted operating state includes a privilege level of an instruction to be accessed at the predicted address;

based on determining a selected return instruction is to be executed, obtaining from the predictor data structure the predicted address to which processing is to be returned; and based on determining the selected return instruction is to be executed, predicting a transitional operating state to be entered based on the predicted operating state stored in the predictor data structure, wherein at least one of the predicted address and the predicted transitional operating state are to be used to validate execution of the selected return instruction.

11. The computer system of claim 10, wherein the selected instruction comprises one of a system call instruction, a hypervisor call instruction or an asynchronous interruption.

12. The computer system of claim 11, wherein the method further comprises placing the predicted address and the predicted operating state corresponding to a future anticipated return on the predictor data structure, based on execution of the selected instruction.

13. The computer system of claim 10, wherein the method further comprises validating execution of the selected return instruction, wherein the validating comprises:

comparing at least a portion of the predicted transitional operating state with obtained operating state; and proceeding with execution of the selected return instruction, based on the comparing indicating a match; and performing recovery of the selected return instruction, based on the comparing indicating a discrepancy.

14. The computer system of claim 13, wherein the proceeding with execution comprises:

unblocking one or more instructions held at dispatch; and completing execution of the selected return instruction.

15. The computer system of claim 10, wherein the predicted operating state is maintained in a decode unit of the pipelined processor, and is separate from a non-speculative operating state maintained in an execute unit of the pipelined processor.

* * * * *